US012057962B2

(12) United States Patent
Garbosa et al.

(10) Patent No.: US 12,057,962 B2
(45) Date of Patent: Aug. 6, 2024

(54) METHOD FOR CONTROLLING THE FUNCTIONING OF TWO OR MORE SMART HOME APPLIANCES

(71) Applicant: Electrolux do Brasil S.A., Curitiba (BR)

(72) Inventors: André Gustavo Souza Garbosa, Curitiba (BR); Jean Carlo Marques Elias, Curitiba (BR); Alexandre Chauffaille Drummond, Curitiba (BR); Gabriel Gemael Polycarpo Lied, Curitiba (BR); Mayra Camargo Laska Gomes, Curitiba (BR); Cesar Augusto Lima, Jr., Curitiba (BR); Rafael Amaral Alonso Lopes, Curitiba (BR); Vinícius Mendonça Weinert, Curitiba (BR); Kim Enig Risager, Curitiba (BR); Ibsen Silva Caldas, Curitiba (BR)

(73) Assignee: Electrolux do Brasil S.A., Curitiba (BR)

( * ) Notice: Subject to any disclaimer, the term of this patent is extended or adjusted under 35 U.S.C. 154(b) by 471 days.

(21) Appl. No.: 17/296,728

(22) PCT Filed: Dec. 3, 2019

(86) PCT No.: PCT/BR2019/050516
§ 371 (c)(1),
(2) Date: May 25, 2021

(87) PCT Pub. No.: WO2020/113298
PCT Pub. Date: Jun. 11, 2020

(65) Prior Publication Data
US 2022/0052868 A1 Feb. 17, 2022

(30) Foreign Application Priority Data

Dec. 5, 2018 (BR) ...................... 10 2018 075196 4

(51) Int. Cl.
*H04L 12/28* (2006.01)

(52) U.S. Cl.
CPC ...... *H04L 12/2829* (2013.01); *H04L 12/2818* (2013.01); *H04L 2012/2841* (2013.01); *H04L 2012/285* (2013.01)

(58) Field of Classification Search
CPC ............. H04L 12/2829; H04L 12/2818; H04L 2012/2841; H04L 2012/285; H04L 12/2816; G05B 19/418
See application file for complete search history.

(56) References Cited

U.S. PATENT DOCUMENTS 7,349,396 B2    3/2008   Ohta et al.
8,451,751 B2    5/2013   Challapali et al.
(Continued)

FOREIGN PATENT DOCUMENTS

CN    1481122 A    3/2004
CN    1650572 A    8/2005
(Continued)

OTHER PUBLICATIONS

Non Final Office Action for U.S. Appl. No. 17/297,775, dated Jul. 7, 2023, 14 pages.
(Continued)

*Primary Examiner* — Suresh Suryawanshi
(74) *Attorney, Agent, or Firm* — Moore & Van Allen PLLC; R. W. McCord Rayburn

(57) ABSTRACT

A method for controlling the functioning of two or more smart home appliances of a network system comprising a cloud server, a terminal device and two or more smart home appliances registered in said cloud server. The method comprises: selecting two or more smart home appliances of the same type; grouping the selected smart home appliances into a products group; selecting control instructions; asso-
(Continued)

ciating the selected control instructions to the products group to define group control instructions; and sending the group control instructions to the grouped smart home appliances so that all the grouped smart home appliances concurrently execute identical functions according to the group control instructions.

26 Claims, 19 Drawing Sheets

(56) References Cited

U.S. PATENT DOCUMENTS

| | | | |
|---|---|---|---|
| 2007/0046493 A1* | 3/2007 | Park | H04L 12/2803 |
| | | | 455/420 |
| 2007/0197236 A1* | 8/2007 | Ahn | H04L 12/2825 |
| | | | 455/466 |
| 2011/0182208 A1 | 7/2011 | Shima et al. | |
| 2013/0338837 A1 | 12/2013 | Hublou et al. | |
| 2015/0019714 A1 | 1/2015 | Shaashua et al. | |
| 2015/0120060 A1 | 4/2015 | Yamashita et al. | |
| 2015/0127174 A1 | 5/2015 | Quam et al. | |
| 2015/0334188 A1 | 11/2015 | Chiba et al. | |
| 2016/0245538 A1 | 8/2016 | Amer et al. | |
| 2016/0261424 A1 | 9/2016 | Gamberini | |
| 2016/0335423 A1 | 11/2016 | Beals | |
| 2017/0171704 A1 | 6/2017 | Frenz | |
| 2017/0234558 A1 | 8/2017 | Gerszewski et al. | |
| 2017/0234566 A1 | 8/2017 | Gerszewski et al. | |
| 2017/0237576 A1 | 8/2017 | Gerszewski et al. | |
| 2017/0359191 A1 | 12/2017 | Smith et al. | |
| 2018/0144615 A1 | 5/2018 | Kinney et al. | |
| 2020/0142470 A1 | 5/2020 | Edwards et al. | |
| 2020/0154340 A1* | 5/2020 | Chen | H04W 72/30 |
| 2020/0304445 A1 | 9/2020 | Dinhthi et al. | |
| 2021/0193333 A1* | 6/2021 | Nishimura | H04Q 9/00 |
| 2021/0271215 A1* | 9/2021 | Ju | H04L 12/2816 |

FOREIGN PATENT DOCUMENTS

| | | | |
|---|---|---|---|
| CN | 101889461 A | 11/2010 | |
| CN | 103780695 A | 5/2014 | |
| CN | 104539587 A | 4/2015 | |
| CN | 104597758 A | 5/2015 | |
| CN | 105099840 A | 11/2015 | |
| CN | 105301982 A | 2/2016 | |
| CN | 105334809 A | 2/2016 | |
| CN | 107087009 A | 8/2017 | |
| CN | 107360064 A | 11/2017 | |
| CN | 108123855 A | 6/2018 | |
| CN | 108710306 A | 10/2018 | |
| WO | WO-2014208099 A1 * | 12/2014 | G08C 17/02 |
| WO | 2017171204 A1 | 10/2017 | |

OTHER PUBLICATIONS

Non Final Office Action for U.S. Appl. No. 17/297,783, dated Jun. 14, 2023, 13 pages.
Final Office Action for U.S. Appl. No. 17/297,775, mailed Feb. 22, 2023, 14 pages.
Chinese Office Action with Search Report for Chinese Application No. 201980080254.X, issued Jan. 24, 2022, with translation, 23 pages.
Non Final Office Action for U.S. Appl. No. 17/297,775, mailed Aug. 18, 2022, 13 pages.
International Search Report and Written Opinion for International Application No. PCT/BR2019/050516, dated Feb. 6, 2020, 12 pages.
International Search Report and Written Opinion for International Application No. PCT/BR2019/050517, dated Feb. 6, 2020, 12 pages.
International Search Report and Written Opinion for International Application No. PCT/BR2019/050515, dated Feb. 10, 2020, 11 pages.
China Office Action for Application No. 201980080157.0, dated Apr. 29, 2022 with translation, 19 pages.
China Office Action for Application No. 201980080158.5, dated May 6, 2022 with translation, 19 pages.

* cited by examiner

METHOD FOR CONTROLLING THE FUNCTIONING OF TWO OR MORE SMART HOME APPLIANCES

This application is a U.S. National Phase application of PCT International Application No. PCT/BR2019/050516, filed Dec. 3, 2019, which claims the benefit of Brazil Patent Application No. 10 2018 075196 4, filed Dec. 5, 2018, both of which are incorporated by reference herein.

The present invention relates to the field of communication technologies, and more particularly, relates to a method and a network for controlling the functioning of home appliances.

BACKGROUND ART

Nowadays the use of home appliances, more particularly smart home appliances, is widespread.

Smart home appliances refer to home appliances which share information and/or communicate with external devices, such as an access point like a home gateway or a smartphone.

According to known systems, smart home appliances can be controlled by computer program running on corresponding computer or mobile phone, also known as application (APP), to implement functions of the smart home appliances.

Due to the high number of functions and/or parameters of smart home appliances, controlling of the smart home appliances through said application may be quite complicated for the user.

The object of the present invention is therefore to overcome the drawback posed by the known technique.

In particular, an object of the present invention is obtaining a more user-friendly control of smart home appliances for user(s).

DISCLOSURE OF THE INVENTION

In a first aspect thereof the present invention relates to a method for controlling the functioning of two or more smart home appliances of a network system comprising a cloud server, a terminal device storing and executing at least one program including instructions and two or more smart home appliances, said two or more smart home appliances being registered in said cloud server, wherein the method comprises the steps of:
  selecting on said terminal device two or more smart home appliances of the same type among said two or more smart home appliances, preferably two or more air conditioning units;
  grouping on said terminal device said selected two or more smart home appliances of the same type into a products group;
  selecting on said terminal device one or more control instructions;
  associating said selected one or more control instructions to said products group to define one or more group control instructions;
  and
  said cloud server sending said one or more group control instructions to said grouped smart home appliances so that all the grouped smart home appliances concurrently execute one or more identical functions according to said one or more group control instructions.

Preferably, said method for controlling the functioning of two or more smart home appliances is a method for wirelessly controlling the functioning of two or more smart home appliances.

Preferably, the same type of appliances are appliances that can be controlled by means of same control instructions and execute identical functions according to said control instructions.

Preferably, the method comprises a phase of adding to said already created products group a further smart home appliance which is of the same type with respect to said grouped smart home appliances.

Preferably, the method comprises the steps of:
  selecting on said terminal device further two or more smart home appliances of the same type among said two or more smart home appliances, preferably two or more air conditioning units;
  grouping on said terminal device said selected further two or more smart home appliances of the same type into a second products group;
  selecting on said terminal device one or more control instructions;
  associating said selected one or more control instructions to said second products group to define one or more group control instructions;
  and
  said cloud server sending said one or more group control instructions to said grouped smart home appliances so that all the grouped smart home appliances of said second products group concurrently execute one or more identical functions according to said one or more group control instructions.

Preferably, the method comprises a phase of creating an activity group comprising the steps of:
  selecting on said terminal device said products group;
  selecting on said terminal device one or more control instructions;
  associating said selected one or more control instructions to said products group;
  selecting on said terminal device a trigger event for each one of said selected one or more control instructions;
  and the method further comprises the steps of:
  activating on said terminal device said activity group; and
  said cloud server sending said selected one or more control instructions to device said selected two or more smart home appliances of the same type of said products group according to said trigger event.

Preferably, the method comprises a step of identifying said activity group with an activity group name by typing a group name via said terminal device.

Preferably, said step of selecting on said terminal device one or more control instructions comprises a step of selecting one or more control instructions among pre-set control instructions, wherein said pre-set control instructions are pre-prepared control instructions registered in said cloud server and/or in said terminal device, which may be executed by said selected one or more smart home appliances or said pre-set control instructions are pre-prepared control instructions created by a user and registered in said cloud server and/or in said terminal device which may be executed by said selected one or more smart home appliances.

Preferably, the method further comprises a step of sending an alert notification to said terminal device when said trigger event occurs or is about to occur or has just occurred and a step of replying through said terminal device to enable said cloud server to send said selected one or more control instructions to said selected one or more smart home appliances.

Preferably, the method further comprises a step of sending a reminder notification to said terminal device to remind that said trigger event occurs or is about to occur or has just occurred.

Preferably, said step of selecting a trigger event for said control instruction comprises the steps of selecting a date and/or a time.

In a preferred embodiment, said step of selecting a trigger event for said control instruction comprises the steps of:
  selecting a date;
  selecting a starting time and an ending time or duration for said selected control instruction.

Preferably, said duration time is automatically set at a predetermined value once the starting time has been selected.

In another preferred embodiment, said step of selecting a trigger event for said selected control instruction comprises the steps of:
  selecting a starting time and an ending time or duration within a day for said selected control instruction;
  activating said starting time and said ending time or duration by selecting one or more days of the week for repeating said selected control instruction at said selected one or more days of the week.

In a further preferred embodiment, said trigger event is a geographical location-based event wherein said geographical location is determined by said cloud server which receive a positioning information from a GPS unit of said terminal device.

Preferably, said geographical location-based event comprises starting or ending said selected one or more control instructions when said terminal device reaches a predetermined distance from the geographical location of said selected one or more smart home appliances while said terminal device is moving away from said selected one or more smart home appliances.

Preferably, said geographical location-based event comprises:
  detecting via said cloud server when said terminal device reaches a predetermined distance from the geographical location of said selected one or more smart home appliances while said terminal device is moving away from said selected one or more smart home appliances;
  sending a notification to said terminal device to accept the starting or ending of said selected control instruction;
  accepting said notification via said terminal device.

In another preferred embodiment, said geographical location-based event comprises starting or ending said selected control instruction when said terminal device reaches a predetermined distance from the geographical location of said selected one or more smart home appliances while said terminal device is moving towards said selected one or more smart home appliances.

In a further preferred embodiment, said trigger event depends on the functioning mode of said selected one or more smart home appliances and/or the functioning status of said selected one or more smart home appliances and/or historical data of said selected one or more smart home appliances.

Historical data preferably refer to the trend of characteristic parameters or features of the smart appliance over time.

Preferably, said network system comprises:
  a first user registered in said cloud server using said terminal device, said first user being able to select on said first terminal device one or more control instructions and to associate said selected one or more control instructions to said registered smart home appliance, said cloud server being able to send said one or more control instructions selected by said first user to said registered smart home appliance; the method comprises the steps of:
creating a sharing users' group for sharing control of said registered smart home appliance,
wherein the first user sends an invitation notification, via said program running on said terminal device, to a second terminal device of a second user to participate to said users' group, said second terminal device storing and executing a program including instructions and
wherein said second user accepts the invitation notification, via said program running on said second terminal device, and
wherein said cloud server associates said second terminal device of said second user to said registered smart home appliance, said second user being able to select on said second terminal device one or more control instructions and being able to associate said selected one or more control instructions to said registered smart home appliance, and said cloud server being able to send said one or more control instructions selected by said second user to said registered smart home appliance.

Advantageously, said users group defines a shared control system wherein said first user and second user both may control the functioning of said registered smart home appliance.

Preferably, after said step of creating a sharing users group, said program running on said terminal device of said first user displays said first user and said second user as members of said users group and said program running on said second terminal device displays said first user and said second user as members of said users group.

Preferably, said program running on said terminal device of said first user further displays said registered smart home appliance associated to said members of said users group and said program running on said second terminal device further displays said registered smart home appliance associated to said members of said users group.

Preferably, said first user is displayed through an icon comprising identification data referred to said first user and said second user is displayed through an icon comprising identification data referred to said second user.

Preferably, said identification data comprises photo and/or name of the user and/or the initial of the name.

Preferably, the smart home appliance is one of: an air conditioning unit, a refrigerator, an oven, a microwave oven, a laundry washing machine, a laundry drying machine, a laundry washing and drying machine, a dishwasher.

Preferably, said terminal device comprises a processor and a memory.

It has to be noted that when we refer to an action on the terminal device, like the actions of "selecting on the terminal device", "activating on the terminal device", "typing a name via the terminal device" it is meant that that the user is interacting with the terminal device, preferably by touch operating a terminal device screen, where the program (APP) is running.

In other words, the program (APP) which is running on the terminal device is configured to interact with the user, for example displaying proper screens/messages/icons/notifications on the terminal device screen, so that the user may carried out said actions by properly operating the terminal device screen.

BRIEF DESCRIPTION OF THE DRAWINGS

Further characteristics and advantages of the present invention will be highlighted in greater detail in the following detailed description of some of its preferred embodiments, provided with reference to the enclosed drawings. In the drawings, corresponding characteristics and/or components are identified by the same reference numbers. In particular.

DETAILED DESCRIPTION OF THE INVENTION

The present invention has proved to be particularly advantageous when applied to the control of home appliances such as air conditioning units or refrigerators, as described below. It should in any case be underlined that the present invention is not limited to such home appliances. On the contrary, the present invention can be conveniently applied to the control of other home appliances, such as ovens, microwave ovens, laundry washing machines, laundry drying machines, laundry washing and drying machines, dishwashers.

More particularly, we will refer hereinafter to smart home appliances, i.e. home appliances which share information and/or communicate with external devices, such as an access point like a home gateway or a smartphone.

Figure 1:
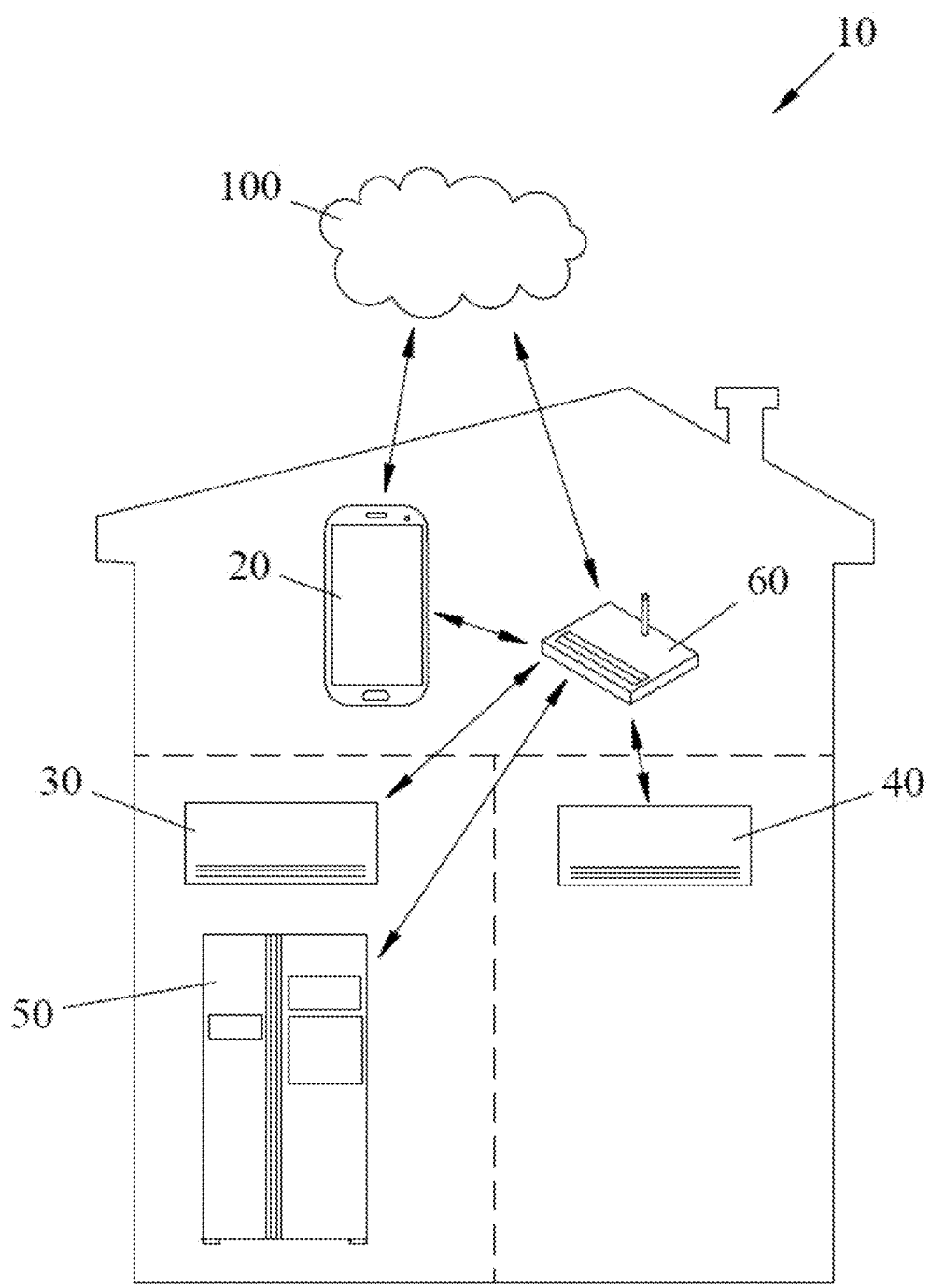
FIG. 1 is a diagram of a network system in accordance with a first embodiment of the present disclosure.

FIG. 1 shows a schematic view of a network system (10) according to an embodiment of the present invention.

The network system (10), according to an example embodiment, preferably comprises a terminal device (20), three smart home appliances (30, 40, 50), an access point (60) and a cloud server (100).

The terminal device (20) preferably comprises an electronic device capable of transmitting and receiving data through wireless communication and having an interface for the user to interact, such as a touchscreen. The terminal device (20) preferably comprises a smart phone or a tablet equipped with a touchscreen. The terminal device (20) preferably comprises a processor and a memory so that the terminal device (20) may store and execute programs including instructions, such as programs known as applications (APPs).

Although FIG. 1 illustrates that the terminal device (20) is a smartphone, this is merely an example and the terminal device (20) is not limited thereto.

Furthermore, the network system may comprise not only one terminal device but a plurality of terminal devices, preferably a plurality of smartphones (as shown in preferred embodiment of FIG. 37 better described later).

Smart home appliances (30, 40, 50) illustrated in FIG. 1 preferably comprise a first air conditioning unit (30), a second air conditioning unit (40) and a refrigerator (50).

Although FIG. 1 illustrates that the smart home appliances are air conditioning units and a refrigerator, this is merely an example and the home appliances are not limited thereto, as already said above.

The network system (10) preferably refers to a home network system (10) wherein the first air conditioning unit (30) may be preferably arranged in a first room (living room) of the house and the second air conditioning unit (40) may be preferably arranged in a second room (bedroom) of the house. Throughout the description, the first air conditioning unit (30) may also be indicated as the living room air conditioning unit and the second air conditioning unit (40) may also be indicated as the bedroom air conditioning unit.

Smart home appliances are home appliances capable of transmitting and receiving data through wireless communication with other devices.

Smart home appliances preferably comprise a wireless communication module and a processor. The communication module is configured to communicate with the access point (60) and the processor is preferably configured to control the overall operation of the home appliance. The communication module preferably comprises an antenna and a wireless communication chip.

In a preferred embodiment, the home appliances preferably comprise a user interface for displaying communication information.

The access point (60) refers to a device that enables a device to be connected to a network. Preferably, the access point (60) refers to a device that enables a device capable of wireless communication to be connected to a network.

For example, the access point (60) may be a wireless fidelity (Wi-Fi) that enables connection to a network through Wi-Fi communication. When the access point (60) allows the connection, the devices connected thereto may be also connected to an external network, preferably the cloud server (100), through the access point (60).

An access point (60) is also usually indicated as home gateway. In a preferred embodiment, the access point (60) is a residential gateway such as a DSL modem. In a further preferred embodiment, the access point (60) may also be a smartphone device.

Access point (60) preferably requires information for the connection thereto, like an SSID (service set identifier). The access point (60) may receive an authentication key from a device, and when the inputted authentication key is correct the access point (60) may allow the device to be connected to the access point (60).

According to FIG. 1, the terminal device (20) and smart home appliances (30, 40, 50) in the house may access the access point (60) for communication therebetween and with the cloud server (100) to form the network system (10).

Preliminary operations are carried out by acting on the terminal device (20) and the smart home appliances (30, 40, 50) for authentication at the access point (60).

At this purpose, the user preferably acts on a dedicated button or a touchscreen key of the smart home appliances (30, 40, 50), or preferably follows manual user's instructions, to operate the communication module for communication with the access point (60). A pairing between the smart home appliances (30, 40, 50) and the access point (60) is thus performed.

The cloud server (100) may be a server that provides a cloud service.

The cloud server (100) may comprise a virtual server which collaborates with various devices over the Internet. A data center operator manages data and operates the cloud server (100). The data center operator may preferably the corporation which manufacturers the smart home appliances (30, 40, 50).

The cloud server (100), for example, may preferably comprise a corporation server physically placed in a country and/or may preferably comprise a corporation cloud platform and the two may preferably communicate therebetween.

The cloud server (100) preferably comprises an application storage server in which at least one application, or APP, is stored. The cloud server (100) may store an application or updated file of application, may transmit the application or the updated file of application to the terminal device (20) according to a request of the terminal device (20) (download request).

The terminal device (20) may install the APP received from the cloud server (100) or may install the application update file received from the cloud server (100), and then may execute the installed APP.

The terminal device (20) may transmit user authentication information to the cloud server (100) to access to the cloud server (100) by using a pre-registered user account. If a user account in the cloud server (100) is absent, the cloud server (100) may perform registration process to register a user account. Hereinafter for convenience of description, it is assumed that a pre-registered user account is already existed. User authentication information may include at least one of user identification number (ID) and password for authentication. The ID and password for authentication may be formed by at least one of symbol, character and number. The ID may include a variety type of indicators capable of identifying a person, such as a user's e-mail address, register number and mobile phone number. As needed, the terminal device (20) may display an input window to receive user identification number and a password for authentication for user authentication. The terminal device (20) may store user identification number and a password for authentication in advance. The user authentication information may be encrypted for security before transmitted to the cloud server (100).

According to an aspect of the invention, the network system (10) is created by using an APP installed in the terminal device (20).

Firstly, a registration process to register a user account is carried out, as said above. For the present invention, it has to be pointed out that a user uses a respective terminal device.

The cloud server (100) preferably comprises a user account storage server in which user authentication information for each user are stored, preferably a user account storage server in the corporation server.

Secondly, a registration process to register the smart home appliances (30, 40, 50) is carried out.

The cloud server (100) preferably comprises a home appliances storage server in which home appliance information implemented by the manufacturer are stored, preferably a home appliances storage server in the corporation server.

The aim of the registration process is to register the smart home appliances (30, 40, 50) using the APP in the terminal device (20).

The appliance registration process firstly comprises the model identification of the smart home appliance (30, 40, 50).

In an embodiment of the invention, for example, the appliance registration is carried out by reading a barcode or a QR code which is printed on the smart home appliance (30, 40, 50) by the manufacturer. Said code is read by using the APP in the terminal device (20).

In a further embodiment of the invention, for example, the appliance registration is carried out by identifying the model and/or the product model and/or the serial number which is printed on the smart home appliance (30, 40, 50) by the manufacturer. Said code is preferably inserted/typed by the user using the APP in the terminal device (20).

Once the smart home appliance (30, 40, 50) has been identified, the cloud server (100) may register the home appliances (30, 40, 50) linked to the terminal device (20) that has carried out the registration process.

The network system (10) is thus created and the cloud server (100), preferably the corporation server, stores user information and home appliances information relating the network system (10).

Figure 2:
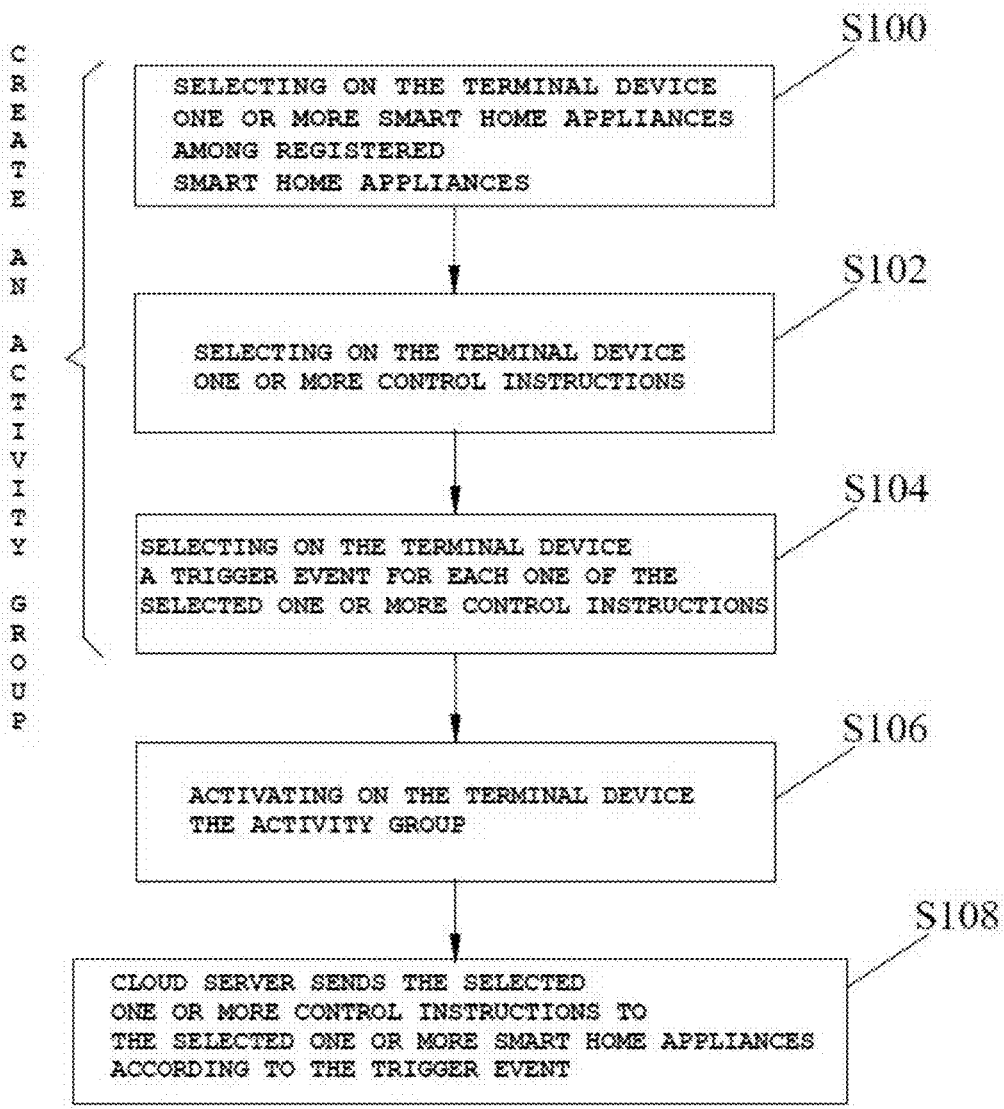
FIG. 2 is a flow chart illustrating a process for controlling the functioning of smart home appliances of a network system in accordance with a first aspect of the present disclosure.

FIG. 2 is a flow chart illustrating an exemplary process for controlling the functioning of one or more of the registered smart home appliances (30, 40, 50) through the APP on the terminal device (20) in accordance with one aspect of the present invention. FIGS. 3 to 11 are views illustrating exemplary screens displayed on the terminal device (20) during said process of controlling the functioning of one or more of the registered smart home appliances (30, 40, 50).

As illustrated in FIG. 2, a phase of creating an activity group may be set up by using the terminal device (20), preferably by acting on the touchscreen of the terminal device (20) by the user.

In step (S100), one or more smart home appliances among the registered smart home appliances are selected on the terminal device (20), preferably via the touchscreen of the terminal device (20).

Preferably, said one or more smart home appliances are selected from an appliances list proposed on screen of the terminal device (20) that lists all the registered smart home appliances.

In step (S102), one or more control instructions are selected on the terminal device (20), preferably via the touchscreen of the terminal device (20).

The term "control instruction" refers to any instruction, or signal, for a home appliance that causes the same to execute a corresponding action.

For example, a control instruction may be "switch ON" or "high fan speed" for an air conditioning unit (30), 40 or "turbo refrigeration" for a refrigerator (50).

In an embodiment, selection in step (S102) preferably comprises the step of selecting one or more control instructions among pre-set control instructions which are proposed on screen of the terminal device (20) for the selected home appliance. The selected one or more control instructions are therefore associated to the selected one or more smart home appliances.

Preferably, the pre-set control instructions are pre-prepared control instructions registered in the cloud server (100) and/or in the terminal device (20) which may be executed by the selected one or more smart home appliances.

In a further preferred embodiment, the pre-set control instructions are pre-prepared control instructions created by the user and registered in the cloud server (100) and/or in the terminal device (20) which may be executed by the selected one or more smart home appliances. Said pre-prepared control instructions are created by the user in an ad-hoc process, not described, carried out via the terminal device (20) through the APP, preferably via the touchscreen of the terminal device (20).

In step (S104), a trigger event is selected for each one of the selected one or more control instructions on the terminal device (20), preferably via the touchscreen of the terminal device (20).

In an embodiment, the trigger event is a trigger time event.

In such a case, preferably, the trigger event in step (S104) preferably comprises the step of selecting a date, for example a day/month/year date format and selecting a starting time and an ending time in that selected day.

In another embodiment, starting time and duration is selected instead of selecting starting and ending times. In a further preferred embodiment, the duration time is automatically set at a predetermined value once the starting time has been selected by the user.

Also, preferably, the trigger event may be a time event which occurs cyclically.

In such a case, preferably, the trigger event in step (S104) preferably comprises a first step of selecting the starting time and the ending time, or duration, within the day and selecting one or more days of the week for repeating the control instruction at the selected one or more days of the week.

In a further preferred embodiment, the trigger event is a geographical location-based event.

At its purpose, the terminal device (20) is preferably equipped with a GPS and positioning information of the terminal device (20) are received by the cloud server (100).

In one embodiment, preferably, the trigger event in step (S104) comprises starting or ending the selected control instruction when the terminal device (20) reaches a predetermined distance from the geographical location of the selected at least one smart home appliance while the terminal device (20) is moving away from the selected at least one smart home appliance. In a preferred embodiment, the cloud server (100) sends a notification to the terminal device (20) to accept the starting or ending of the selected control instruction and the terminal device (20) (user) accepts the notification to eventually activate the trigger event.

In another embodiment, preferably, the trigger event in step (S104) comprises starting or ending the selected control instruction when the terminal device (20) reaches a predetermined distance from the geographical location of the selected at least one smart home appliance while the terminal device (20) is moving towards the selected at least one smart home appliance.

In further preferred embodiments, the trigger event in step (S104) may be an event which depends on other parameters, like for example:

the functioning mode of the selected one or more smart home appliances; or the functioning status of the selected one or more smart home appliances; or historical data on functioning of the selected one or more smart home appliances.

Historical data preferably refer to the trend of characteristic parameters or features of the smart appliance over time.

For example, when the selected smart home appliance is a refrigerator, the trigger event may depend on the inside temperature changing of the refrigerator (functioning mode) or outside temperature changing or season changing or sunset/sunrise conditions (functioning status) or the frequency of refrigerator door opening (historical data).

In a first example, the trigger event may set as "when the door is opened more than a prefixed number of times in prefixed period of time" that can be associated to the "Turbo refrigerator" control instruction, i.e. the refrigerator is controlled to increase the cooling capacity when the door is often opened.

In a further example, when the selected smart home appliance is an air conditioning unit, the trigger event may set as "when the temperature inside the room is higher than a prefixed value" that can be associated to a "Powerful" control instruction, i.e. the air conditioning unit is controlled to increase the cooling capacity when the room temperature is too high.

After step (S104) has been carried out, the phase of creating an activity group is concluded.

In step (S106), the activity group previously created is activated on said terminal device (20), preferably via the touchscreen of the terminal device (20).

According to an aspect of the invention, after activation of the activity group the cloud server (100) manages the functioning of the selected one or more smart home appliances (step (S108)).

In step (S108), the cloud server (100) sends the selected one or more control instructions to the selected one or more smart home appliances according to the trigger event.

In a preferred embodiment, preferably, the process further comprises a step of sending an alert notification to the terminal device (20) (user) when the trigger event occurs, or is about to occur or has just occurred, and a step of replying through the terminal device (20) to enable the cloud server (100) to eventually send the selected one or more control instructions to the selected one or more smart home appliances.

In a further preferred embodiment, preferably, the process further comprises a step of sending a reminder notification to the terminal device (20) (to the user) to remind that the trigger event occurs or is about to occur or has just occurred.

FIGS. 3 to 11 are views illustrating an exemplary screen displayed on the terminal device (20) during a process of controlling home appliances (30, 40, 50) in a network system (10) as illustrated in FIG. 1 and according to a first embodiment of the above described method shown in FIG. 2.

Figure 3:
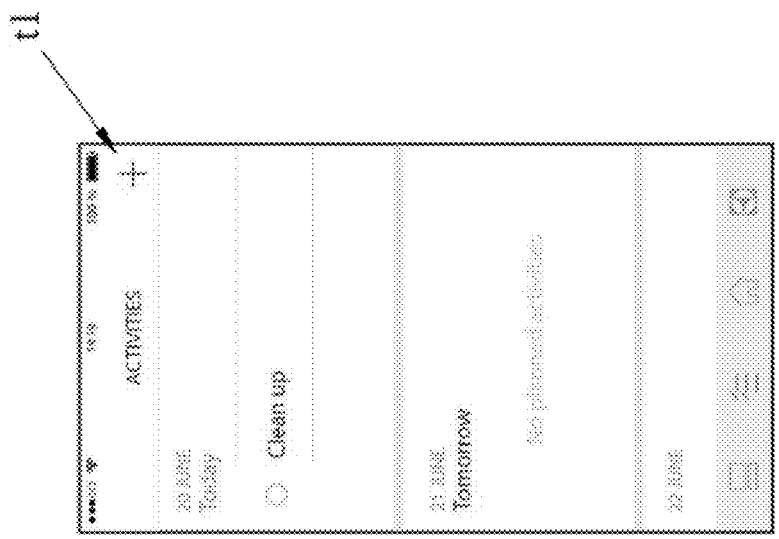

As illustrated in FIG. 3, the terminal device (20) displays a main screen for "ACTIVITIES" wherein different visual elements (Icon) and tools are arranged. Tools are preferably realized by an image so that a user intuitively recognizes the function thereof. The main screen here illustrated shows that no activities are planned for today JUNE, 20 and tomorrow JUNE, 21 (only a reminder "clean up" for today is displayed).

Figure 5:
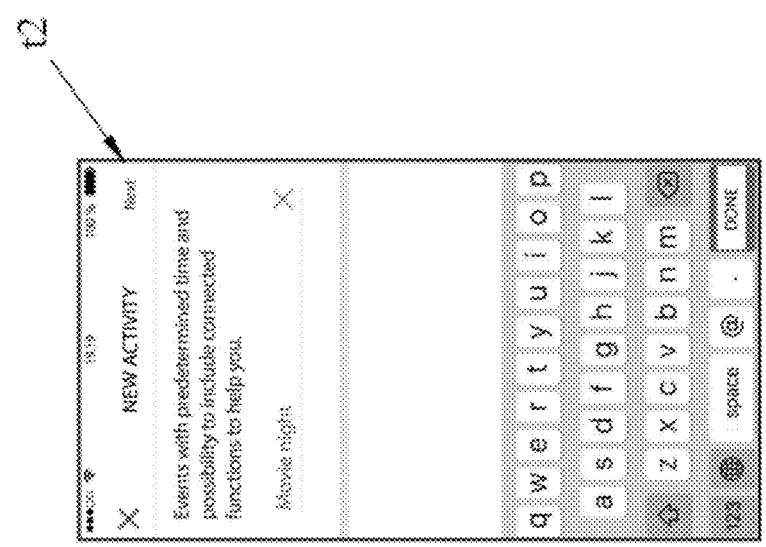
FIGS. 3 to 31 are views illustrating an exemplary screen displayed on a terminal device during a process for controlling the functioning of smart home appliances.
Figure 4:
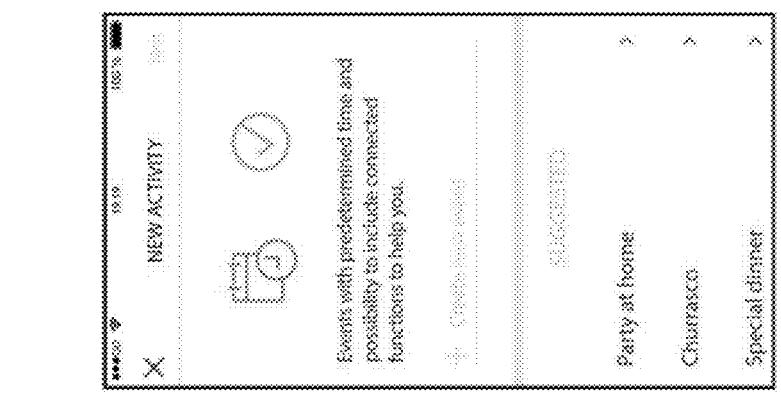
Figure 6:
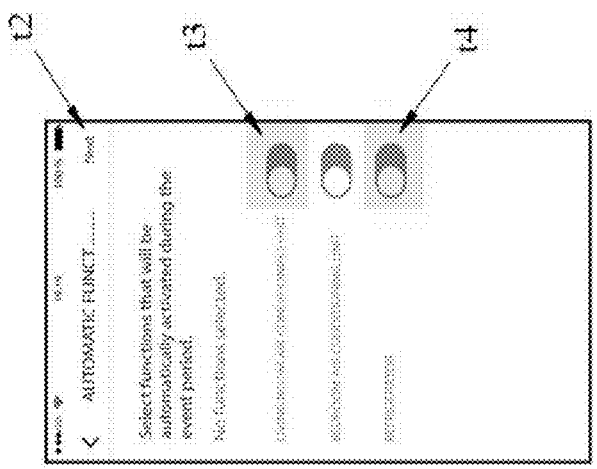

A user may start to create an activity group by touch operating the addition tool t1. The terminal device (20) displays a new activity group screen, as illustrated in FIG. 4, in response to touch operation. When the new activity group is displayed, a user may type a name for the new activity group, for example "movie night" (FIG. 5). As soon as the user types a word, the next tool t2 is enabled. By touch operating the next tool t2 or the key "DONE" on the keyboard, the terminal device (20) displays a smart home appliances selection screen (FIG. 6). The user may select at least one smart home appliance among a plurality of home appliances listed on the screen. Home appliances listed on the screen refer to home appliances already registered in the cloud server (100), as explained above.

Registration process for smart home appliances, not described in detail, is carried out through proper screens displayed on the terminal device (20).

As shown in the example of FIG. 6, the list comprises three smart home appliances already registered in the cloud server (100), namely the "living room air conditioning unit", the "bedroom air conditioning unit" and the "refrigerator", which correspond to the first air conditioning (30), the second air conditioning unit (40) and the refrigerator (50) of the network system (10).

According to present example, the user has selected the "living room air conditioning unit" and the "refrigerator" by touch operating corresponding selection tools (toggle t3 and t4).

Figure 7:
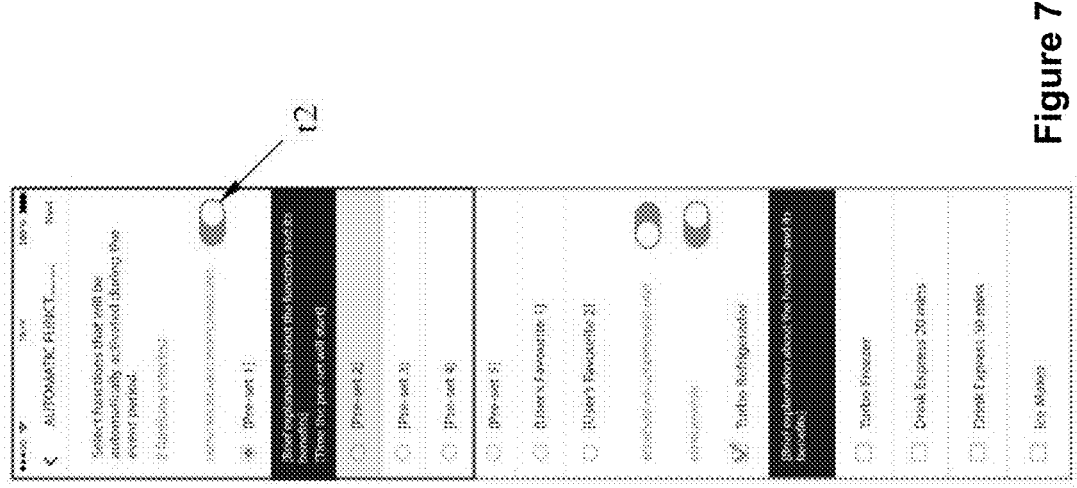

By touch operating the next tool t2 the terminal device (20) displays a control instructions selection screen (FIG. 7). A first group of control instructions are associated, or linked, to the "living room air conditioning unit" previously selected and a second group of control instructions are associated, or linked, to the "refrigerator" previously selected.

The user may select a control instruction of the first group among a plurality of pre-set control instructions listed on the screen. "Pre-set 1" to "Pre-set 5" are pre-prepared control instructions registered in the cloud server (100) and/or in the terminal device (20) which may be executed by the "living room air conditioning unit" and "User's favourite 1" and "User's favourite 2" are pre-prepared control instructions created by the user and registered in the cloud server (100) and/or in the terminal device (20) which may also be executed by the "living room air conditioning unit".

Figure 8:
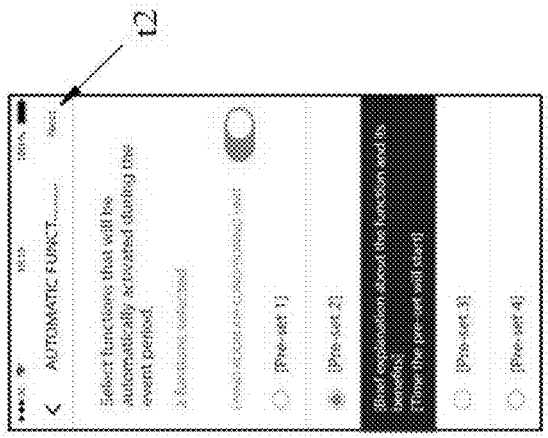

Here, the user has selected the "Pre-set 2" control instruction (FIG. 8).

Analogously, the user may select a control instruction of the second group among a plurality of pre-set control instructions listed on the screen. "Turbo refrigerator", "Turbo freezer", etc. are all pre-prepared control instructions registered in the cloud server (100) and/or in the terminal device (20) which may be executed by the "refrigerator".

Here, the user has selected the "Turbo refrigerator" control instruction (FIG. 7).

It has to be noted that a pre-set control instruction may comprise a single action, like for example the turbo refrigerator action for the refrigerator, but may also comprise a plurality of actions, like for example the functioning mode (cooling or dehumidification or heating), the fan speed and inclination of the airflow direction flap for the air conditioning unit.

Figure 9:
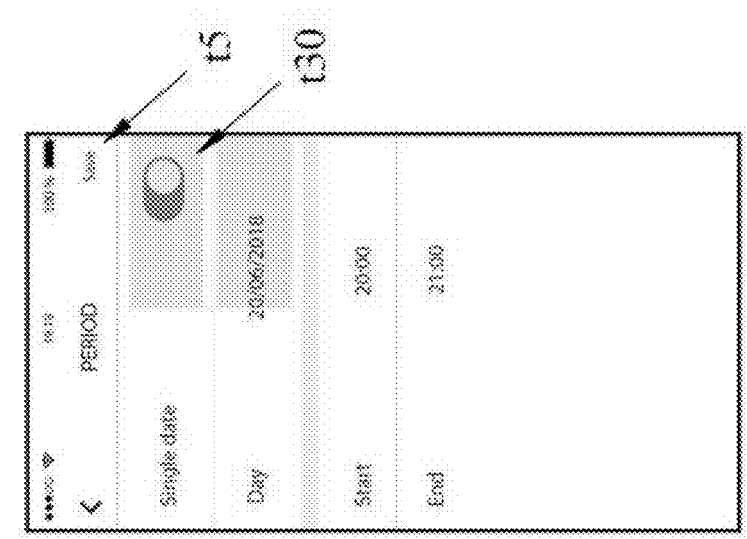

By touch operating the next tool t2 (FIG. 7 or FIG. 8) the terminal device (20) displays a trigger event selection screen (FIG. 9).

The trigger event of the present example is preferably a time event.

The user may select a single date, for example the current day "Thursday" 20/06/2018, and a starting time 20:00 and an ending time 21:00 (FIG. 9).

Selection of a single date event is carried out by touch operating the selection tool (toggle t30).

In further preferred embodiments, a starting time and a duration time may be set, or the duration time may be automatically set at a predetermined value once the starting time has been selected (for example a predetermined duration of 8 hours).

Also, the trigger time event here selected is a single date event, namely the current day "Thursday".

Figure 10:
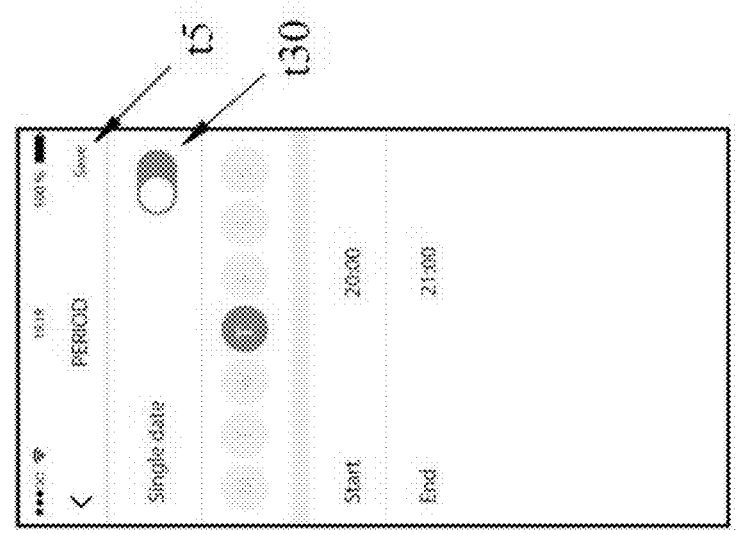

In further embodiments, the time event may be preferably set to occurs cyclically/periodically, for example repeated every week in one or more desired days of the week (FIG. 10).

Selection of a cyclically time event is carried out by touch operating the selection tool (toggle t30). Preferably, the cyclically time event is proposed on the screen when toggle t30 is de-activated.

The cyclically time event of the present example occurs every "Thursday" with a starting time 20:00 and an ending time 21:00 (FIG. 10).

The set trigger event is associated to the selected control instructions "Pre-set 2" of the "living room air conditioning unit" and "Turbo refrigerator" of the "refrigerator".

Figure 11:
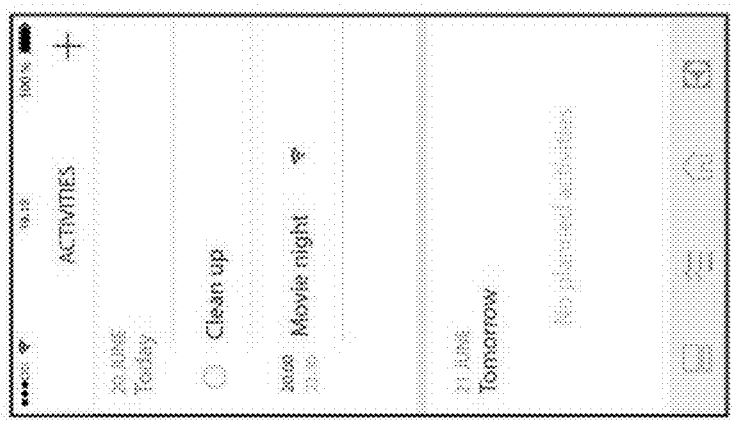

By touch operating the save tool t5 the terminal device (20) saves the activity as created and displays the main screen for "ACTIVITIES" wherein the created activity "movie night" is displayed (FIG. 11).

In one embodiment, the activity just saved is active and ready to be performed. In further embodiments, the saved activity needs to be activated by the user, for example by acting on a tick, in a proper activation screen (not shown) in order to be ready to be performed.

According to the invention, once the created activity has been activated, functioning of the "living room air conditioning unit" and of the "refrigerator" will be controlled through the selected control instructions and according to said trigger event via the cloud server (100).

In particular, the cloud server (100) will send the selected control instructions to the selected home appliances according to the trigger event. In the example, the cloud server (100) will send the control instruction "Pre-set 2" to the "living room air conditioning unit" and the control instruction "Turbo refrigerator" to the "refrigerator" from 20:00 to 21:00 of today Thursday 20/06/2018 (or alternatively from 20:00 to 21:00 of every Thursday if the cyclical time event was selected).

FIGS. 12 to 16 are views illustrating an exemplary screen displayed on the terminal device (20) during a process of controlling home appliances (30, 40, 50) in a network system (10) as illustrated in FIG. 1 and according to a second embodiment of the above described method shown in FIG. 2.

Figure 12:
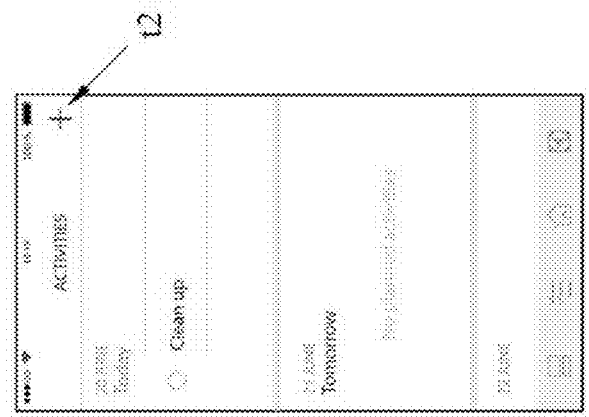

As illustrated in FIG. 12, the terminal device (20) displays a main screen for "ACTIVITIES" and no activities are planned for today JUNE, 20 and tomorrow JUNE, 21 (only a reminder "clean up" for today is displayed).

Figure 13:
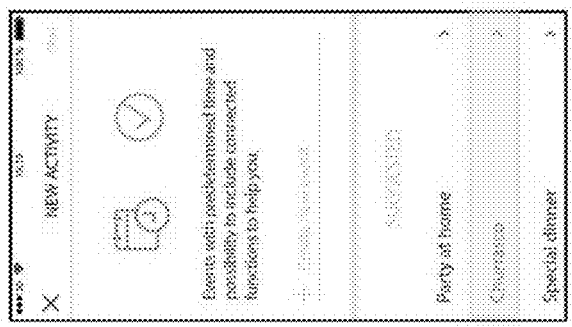

A user may start to create an activity group by touch operating the addition tool t2. The terminal device (20) displays a new activity group screen, as illustrated in FIG. 13, in response to touch operation. When the new activity group is displayed, a user may preferably type a name for the new activity group as previously described with reference to first preferred embodiment.

Here, instead, the user selects one activity among a plurality of activities listed on the screen. Activities listed on the screen refer to pre-set activities already registered in the cloud server (100) and/or in the terminal device (20).

According to present example, the user has selected the activity named "Churrasco".

Figure 14:
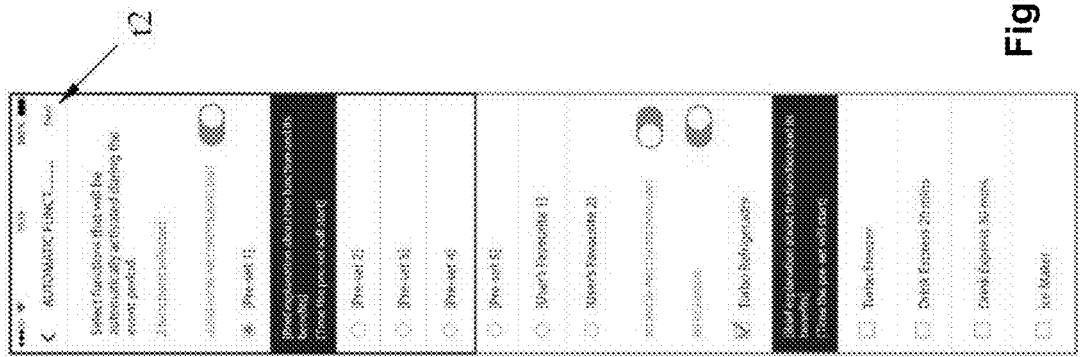
Figure 16:
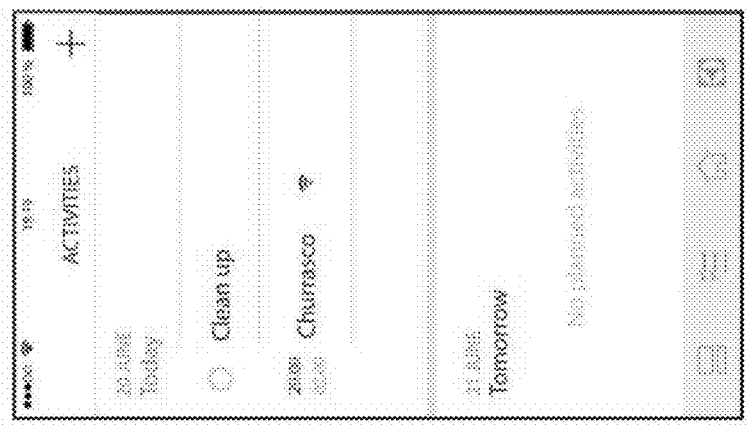
Figure 15:
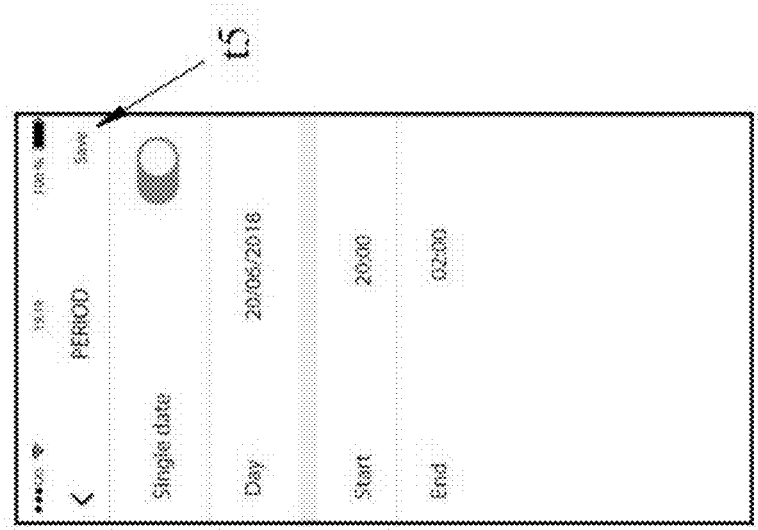

When the user selects the activity "Churrasco" the terminal device (20) displays the pre-selected smart home appliances and the respective pre-selected control instructions, namely the "living room air conditioning unit" with the control instruction "Pre-set 1" and the "refrigerator" with the control instruction "Turbo refrigerator" (FIG. 14).

At its own discretion, the user may select a different pre-select control instruction from the ones proposed by default.

By touch operating the next tool t2 the terminal device (20) displays the trigger event selection screen (FIG. 15) with the pre-set values, namely the date of Jun. 20, 2018 with starting time of 20:00 and ending time 02:00.

At its own discretion, the user may change said values.

By touch operating the save tool t5 the terminal device (20) saves the activity and displays the main screen for "ACTIVITIES" wherein the activity "Churrasco" is displayed.

Finally, and according to the above described embodiment, the activity "Churrasco" is activated and the cloud server (100) will control the functioning of the "living room air conditioning unit" and the "refrigerator" accordingly.

FIGS. 17 to 31 are views illustrating an exemplary screen displayed on the terminal device (20) during a process of controlling home appliances (30, 40, 50) in a network system (10) as illustrated in FIG. 1 and according to a third embodiment of the above described method shown in FIG. 2.

In this embodiment, the term "ROUTINE" has to be considered equivalent to the term "ACTIVITIES" used in previous embodiments.

Figure 17:
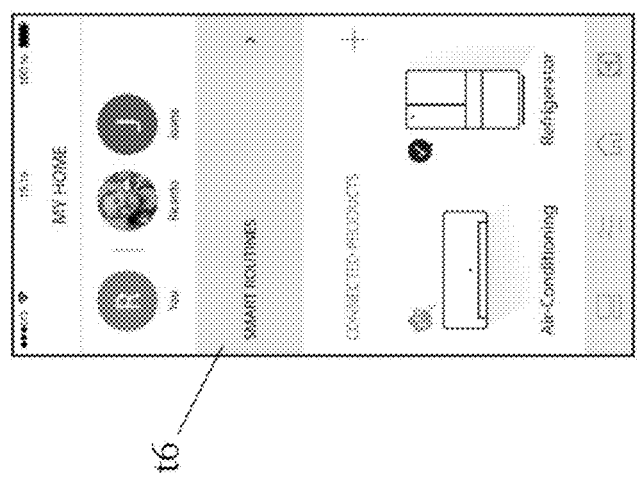

As illustrated in FIG. 17, the terminal device (20) displays a main screen wherein different visual elements (Icon) and tools are arranged.

At the top of the screen a group of users is shown that represent a user's group, as better described later in the description.

At the bottom of the screen the registered home appliances are shown, i.e. the air conditioning unit and the refrigerator.

In the middle of the screen, a link tool t6 to routines is shown.

Figure 18:
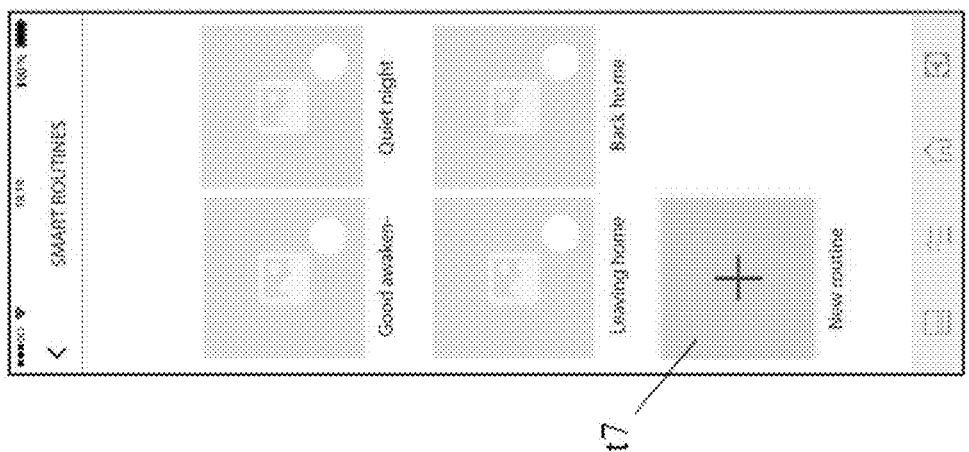

A user may enter the routines screen by touch operating the link tool t6. The terminal device (20) displays a routine screen, as illustrated in FIG. 18, which shows a plurality of selectable registered routines, "Good awakening", "Quiet night" etc, and an addition tool t7. A user may start to create a routine by touch operating the addition tool t7.

Figure 19:
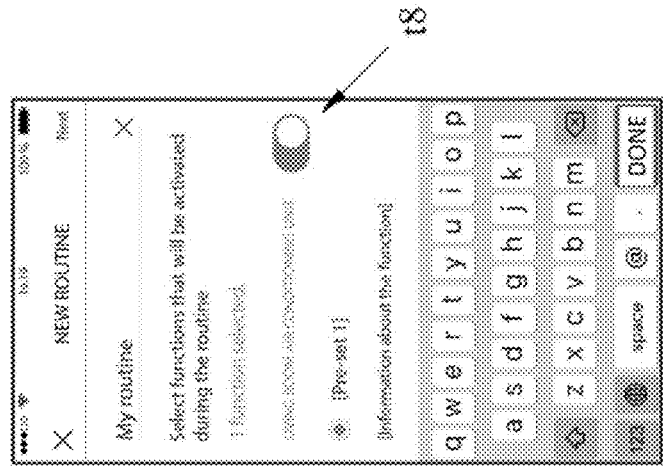

The terminal device (20) displays a new routine screen, as illustrated in FIG. 19, in response to touch operation. The user may type a name for the new routine, for example "My routine". From the same new routine screen, the user may select at least one smart home appliance among a plurality of home appliances listed on the screen. Home appliances listed on the screen refer to home appliances already registered in the cloud server (100), as explained above.

Figure 22:
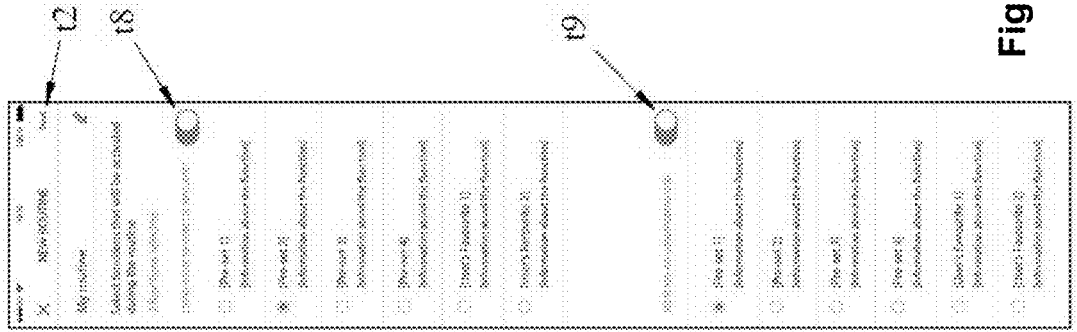
Figure 21:
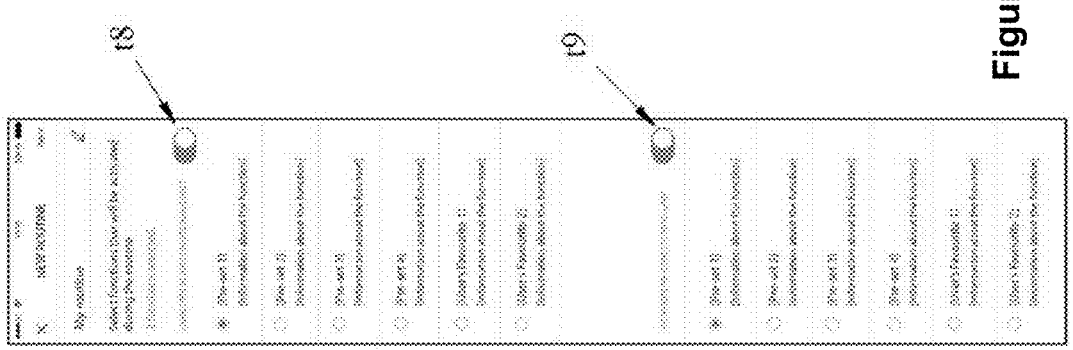
Figure 20:
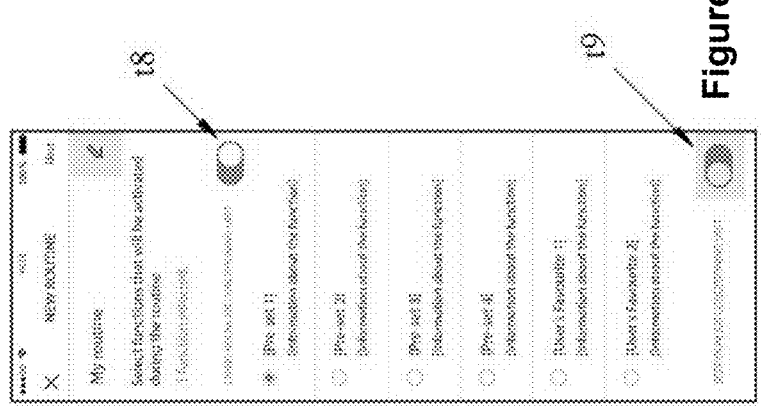

According to present example, the user has selected the "living room air conditioning unit" and the bedroom air conditioning unit by touch operating corresponding selection tools (toggle t8 and t9—FIGS. 20 to 22).

When the home appliance is selected, the terminal device (20) displays a group of control instructions which are associated, or linked, to the selected home appliance.

The user may select a control instruction among the plurality of pre-set control instructions listed on the screen.

"Pre-set 1" to "pre-set 4", "User's favourite 1" and "User's favourite 2" are pre-prepared control instructions registered in the cloud server (100) and/or in the terminal device (20) which are associated to the living room air conditioning unit and that may be executed by the living room air conditioning unit.

"User's favourite 1" and "User's favourite 2" preferably are pre-prepared control instructions created by the user.

Analogously, "Pre-set 1" to "pre-set 4", "User's favourite 1" and "User's favourite 2" are pre-prepared control instructions registered in the cloud server (100) and/or in the terminal device (20) which are associated to the bedroom air conditioning unit and may be executed by the bedroom air conditioning unit.

"User's favourite 1" and "User's favourite 2" preferably are pre-prepared control instructions created by the user.

Here, the user has selected the "Pre-set 2" control instruction for the living room air conditioning unit and the "Pre-set 1" control instruction for the bedroom air conditioning unit (FIG. 22).

Figure 23:
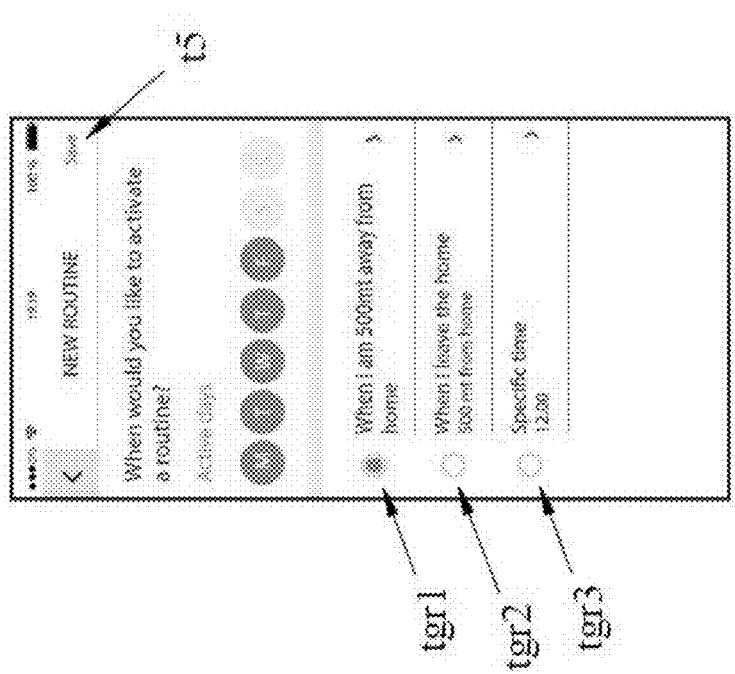

By touch operating the next tool t2 the terminal device (20) displays a trigger event selection screen (FIG. 23).

The trigger event selection screen (FIG. 23) offers three trigger events:
a first geographical location-based event trg1;
a second geographical location-based event trg2; and
a time event trg3.

The first trigger event trg1 is indicated as "When I am 500 mt away from home" that means that the trigger event tgr1 is activated when the terminal device (20), or the user, reaches a distance of 500 m from the home while the terminal device (20) (user) is moving towards the home.

Here, home indicates the geographical location of the selected home appliances, namely the living room air conditioning unit and the bedroom air conditioning unit (FIG. 22).

Control of the distance is carried out by the cloud server (100) which preferably receives positioning information from a GPS mounted on the terminal device (20) and compares them with the geographical location of the selected home appliances, which coincides with the home. The geographical location of the selected home appliances is preferably known to the cloud server (100) when the user registers himself by creating a user account. During the registration process, the user preferably registers its geographical location, preferably either typing the home address or via Google Maps®.

Figure 25:
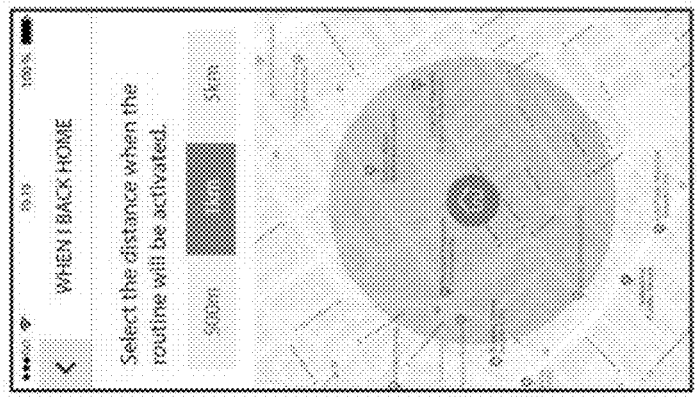
Figure 24:
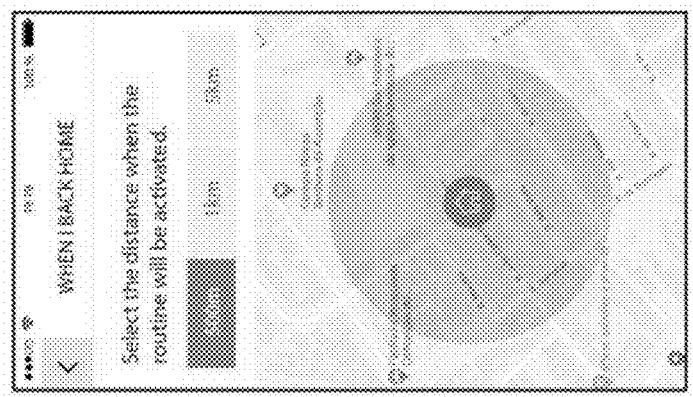

The user may preferably select a distance among three pre-set distances: 500 mt, 1 km and 5 km (FIGS. 24 and 25).

Here, the user has selected a distance of 1 km (FIG. 25).

In a preferred embodiment, the cloud server (100) before the activation of the second event trigger trg2 when the user leaving the home reaches the selected distance sends a notification to the terminal device of the user and activates the second event trigger trg2 only if the user accepts the notification.

Figure 26:
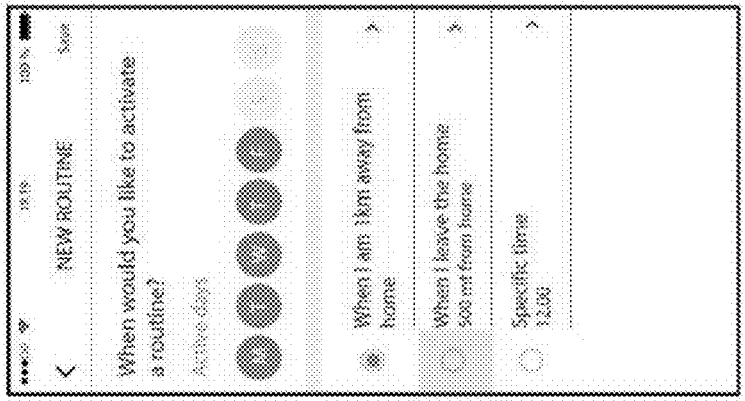

The second trigger event trg2, as shown in FIG. 26, is indicated as "When I leave the home that means that the trigger event tgr2 is activated when the terminal device (20), or the user, reaches a distance of 1 km from the home while the terminal device (20) (user) is leaving home.

The user may preferably select a distance among three pre-set distances: 500 m, 1 km and 5 km.

Figure 28:
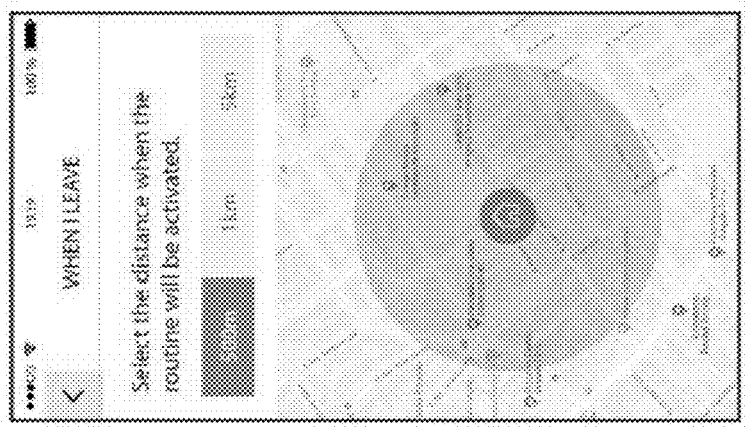
Figure 27:
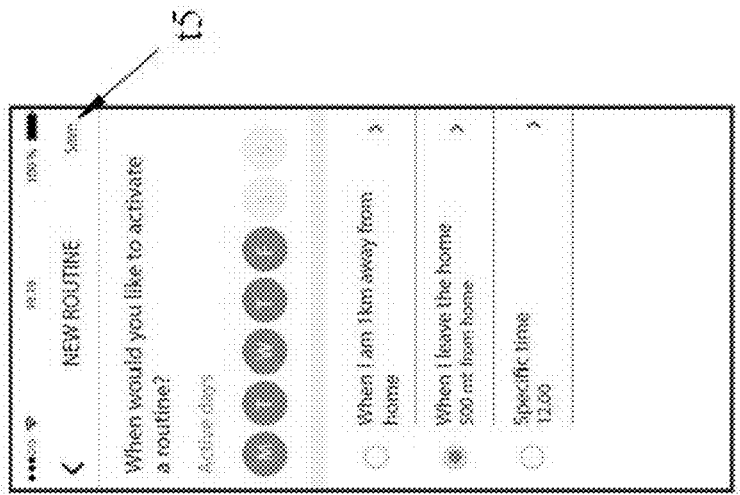

Here, the user has selected a distance of 500 m (FIG. 28).

It has to be noted that the second trigger event trg2 preferably depends on the number of terminal devices, or users, which may control the home appliances.

As described better later, terminal devices, or users, may be more than one an all may share the control of the home appliances through the APP.

In a further preferred embodiment, for example, the first trigger event trg2 may be indicated as "When all are at 1 km away from home" that means that the trigger event tgr2 is activated when all the terminal devices, or the users, have left the home. In other words, the second trigger event trg2 is eventually activated only when the last user leaving the home reaches the selected distance.

In a preferred embodiment, the cloud server (100) before the activation of the second event trigger trg2 when the last user leaving the home reaches the selected distance sends a notification to the terminal device of the last user and activates the second event trigger trg2 only if the last user accepts the notification.

As said above, the second trigger event trg2 preferably depends on the number of terminal devices, or users, which may control the home appliances.

The third trigger event trg3 is preferably a time event and is indicated as "Specific time".

The user may select a specific starting time 13:00 (FIG. 30) and a duration time is automatically set at a predetermined value, for example 8 hours.

In an upper part of the trigger event selection screen (FIGS. 23, 26 and 27), then, icons of the days of the week are selectable so that the selected trigger event may be set to occur cyclically.

Here, the user has selected days Monday to Friday.

Figure 31:
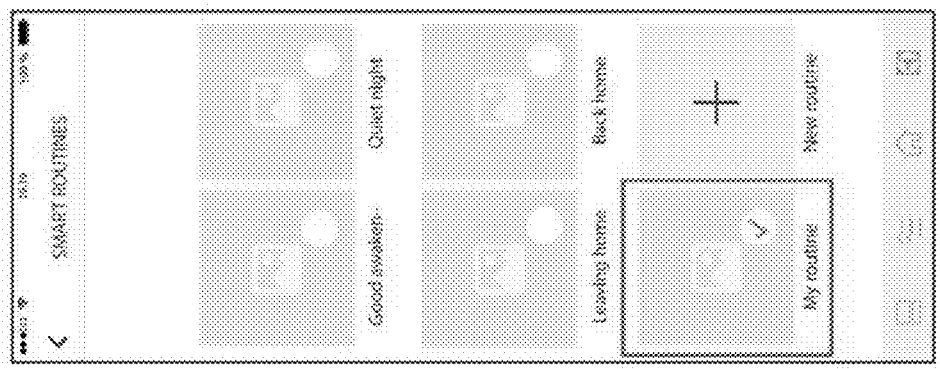
Figure 30:
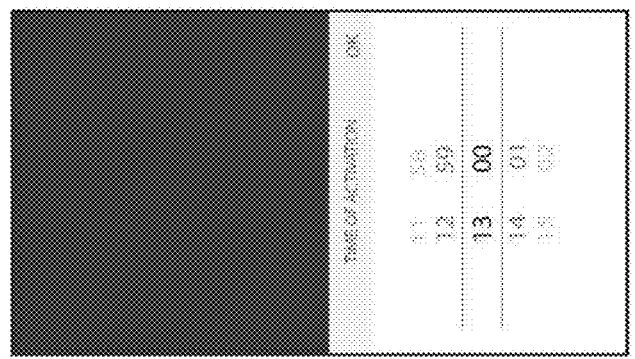
Figure 29:
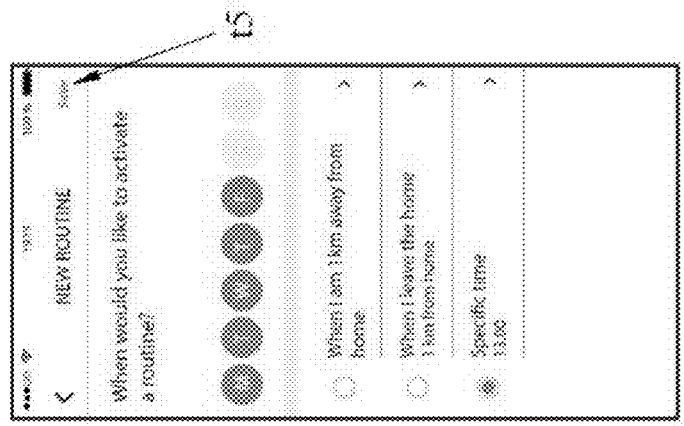

By touch operating the save tool t5 (FIG. 29) the terminal device (20) saves the routine with the selected trigger event and displays the screen wherein the routine "My Routine" is displayed and automatically activated (FIG. 31). The user may also deactivate the routine. The cloud server (100), then, will control the functioning of the living room air conditioning unit and of the bedroom air conditioning unit according to the routine parameters.

Figure 32:
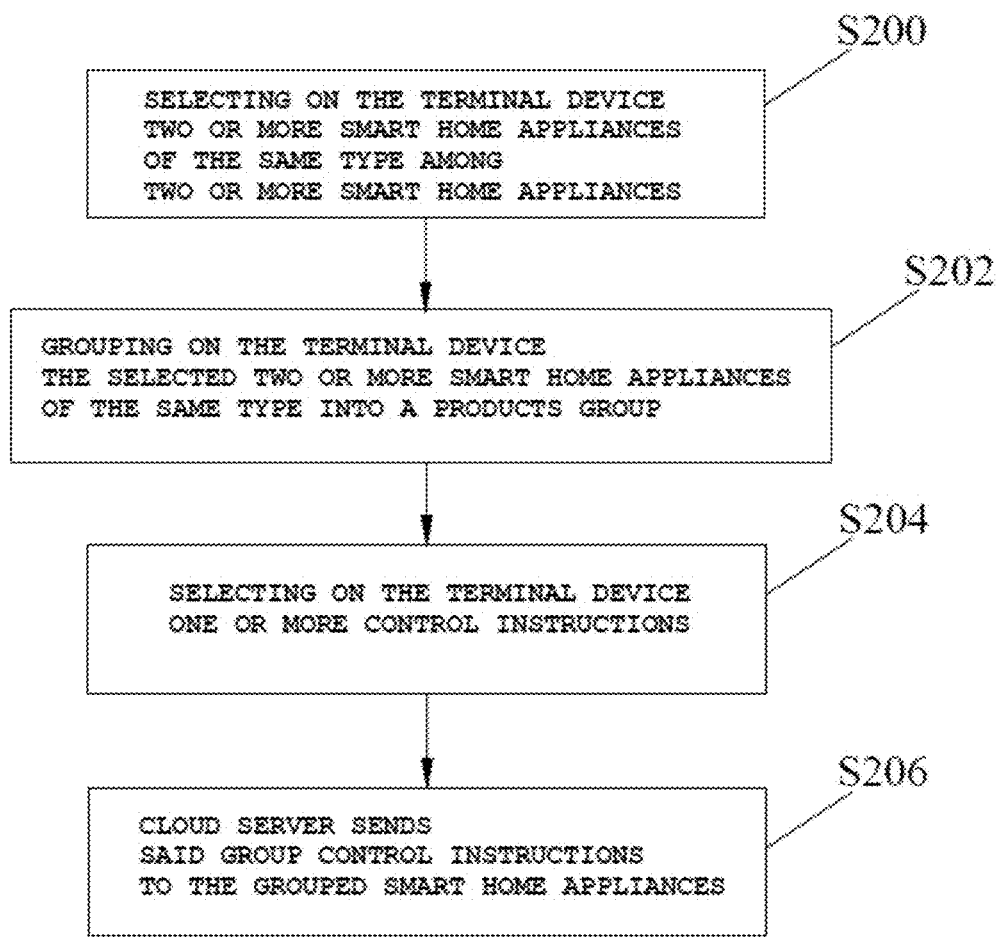
FIG. 32 is a flow chart illustrating a process for controlling the functioning of smart home appliances of a network system in accordance with a second aspect of the present disclosure.

FIG. 32 is a flow chart illustrating an exemplary process for controlling the functioning of two or more of the registered smart home appliances (30, 40, 50) through the APP on the terminal device (20) in accordance with a second aspect of the present invention. FIGS. 33 to 36 are views illustrating exemplary screens displayed on the terminal device (20) during said process of controlling the functioning of two or more of the registered smart home appliances (30, 40, 50).

As illustrated in FIG. 32, steps of the method may be set up by using the terminal device (20), preferably by acting on the touchscreen of the terminal device (20) by the user.

In step (S200), two or more smart home appliances of the same type among said two or more smart home appliances are selected on the terminal device (20), preferably via the touchscreen of the terminal device (20).

The terms "appliances of the same type" preferably refer to appliances that can be controlled by means of same control instructions and execute identical functions according to said control instructions.

For example, the first air conditioning unit (30) and the second air conditioning unit (40) are of the same type if they can be controlled by means of same control instructions and execute identical functions according to said control instructions.

It has to be noted that "two appliances of the same type" does not necessarily imply that the two appliances are identical.

Referring to a first air conditioning unit and a second air conditioning unit, for example, they can be of different size according to the total BTU cooling power needed to efficiently cool down the respective room where they are placed.

Nevertheless, despite their different sizes, they can be controlled by means of same equivalent control instructions and execute equivalent functions in the respective room.

In general, two appliances of the same type may preferably be two air conditioning units, two refrigerators, two ovens, two microwave ovens, two laundry washing machines, two laundry drying machines, two laundry washing and drying machines, two dishwashers.

In step (S202), the selected two or more smart home appliances of the same type are grouped on the terminal device (20), preferably via the touchscreen of the terminal device (20), into a products group.

In step (S204), one or more control instructions are selected on the terminal device (20), preferably via the touchscreen of the terminal device (20).

The term "control instruction", as explained above, refers to any instruction, or signal, for a home appliance that causes the same to execute a corresponding action.

In an embodiment, the selection in step (S204) preferably comprises the step of selecting one or more control instructions among pre-set control instructions which are proposed on screen of the terminal device (20) which may be executed by all the home appliances grouped in the products group.

The selected one or more control instructions are therefore associated to all the home appliances grouped in the products group. The selected one or more control instructions represent respective one or more group control instructions.

Preferably, the pre-set control instructions are pre-prepared control instructions registered in the cloud server (100) and/or in the terminal device (20) which may be executed by the home appliances grouped in the products group.

In a further preferred embodiment, the pre-set control instructions are pre-prepared control instructions created by the user and registered in the cloud server (100) and/or in the terminal device (20) which may be executed by the home appliances grouped in the products group. Said pre-prepared control instructions are created by the user in an ad-hoc process, not described, carried out via the terminal device (20) through the APP, preferably via the touchscreen of the terminal device (20).

According to an aspect of the invention, the cloud server (100) manages the functioning of the home appliances grouped in the products group (step (S206)).

In step (S206), the cloud server (100) sends the one or more group control instructions to the grouped smart home appliances so that all the grouped smart home appliances concurrently execute one or more identical functions according to said group control instructions.

In an embodiment, after the products group has been created, a further smart home appliance which is of the same type with respect to the grouped smart home appliances may be added to the created products group.

The added smart home appliance, therefore, will receive and execute the same group control instructions sent from the cloud server (100) to the other grouped smart home appliances of the products group.

In another embodiment, the process foreseen the creation of a further/second products group. The process will be implemented through the same steps as illustrated and described with reference to flow chart of FIG. 32.

FIGS. 33 to 36 are views illustrating an exemplary screen displayed on the terminal device (20) during a process of controlling home appliances (30, 40, 50) in a network system (10) as illustrated in FIG. 1 and according to the above described method shown in FIG. 32.

In particular, FIGS. 33 to 36 refer to the steps of grouping home appliances of the same type into a products group.

Figure 33:
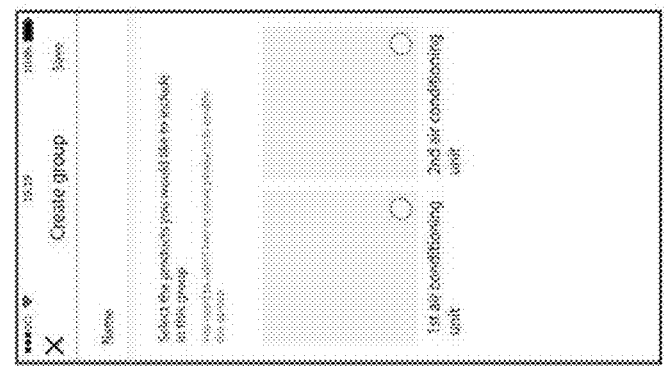

As illustrated in FIG. 33, the terminal device (20) displays a group creation screen. The group creation screen shows the registered smart home appliances of the same type that do not belong to other groups. In the example here illustrated the first air conditioning unit and the second air conditioning unit are displayed.

Figure 35:
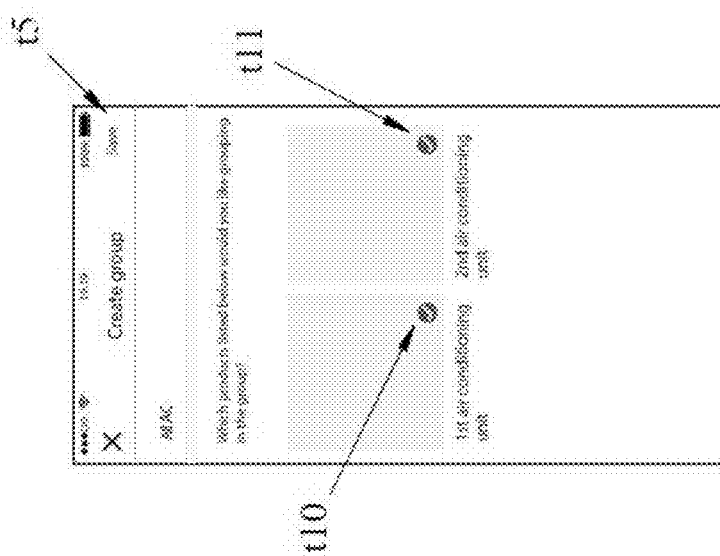
Figure 34:
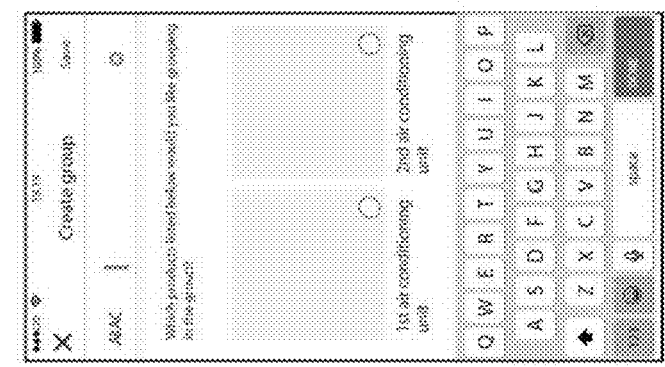

The user may type a name "All AC" for the new products group (FIG. 34). By touch operating key "DONE", the terminal device (20) displays a smart home appliances selection screen (FIG. 35). The user may select two or more of the smart home appliances of the same type displayed.

According to present example, the user has selected both the first air conditioning unit and the second air conditioning unit by touch operating the respective selection tools (tick t10 and t11).

Figure 36:
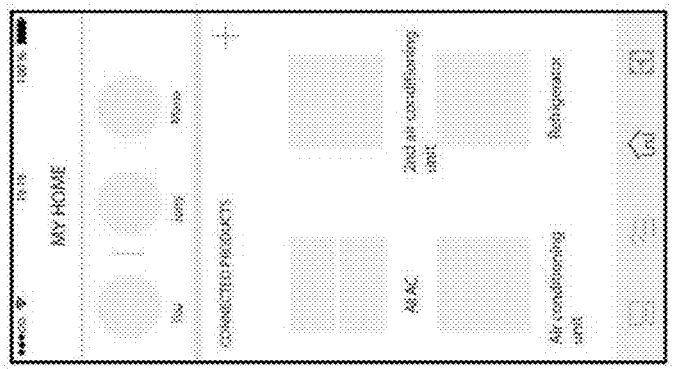
FIGS. 33 to 36 are views illustrating an exemplary screen displayed on a terminal device during a process for controlling the functioning of smart home appliances.

By touch operating the save tool t5 the terminal device (20) saves the products group as created and displays a screen wherein the created products group "All AC" is displayed (FIG. 36).

It is worth noting that even if the products group comprises a plurality of smart home appliances, the products group is considered equivalent to a single registered smart home appliance. This can be also appreciated on FIG. 36 wherein the products group "All AC" appears like others registered smart home appliances, i.e. the air conditioning unit, the second air conditioning unit and the refrigerator.

Starting from the above consideration that the products group is considered equivalent to a single registered smart home appliance, it follows that the method for controlling the functioning of one or more registered smart home appliances as described above, FIGS. 2 to 31, may be applied mutatis mutandis to a products group by considering the products group as one of the registered smart home appliances.

Therefore, accordingly, it is possible to associate one or more control instructions and selecting proper trigger event to a products group, being clear that a control instruction sent to the products group, also called group control instruction, is executed by all the smart home appliances of the products group.

For example, a "Pre-set 1" control instruction, as previously described in connection to the first aspect of the invention, which is sent to the products group "All AC", either via an activity group or a routine, causes the first air conditioning unit and the second air conditioning unit to concurrently execute actions of the "Pre-set 1" control instruction. "Pre-set 1" is therefore considered as a group control instruction.

Figure 37:
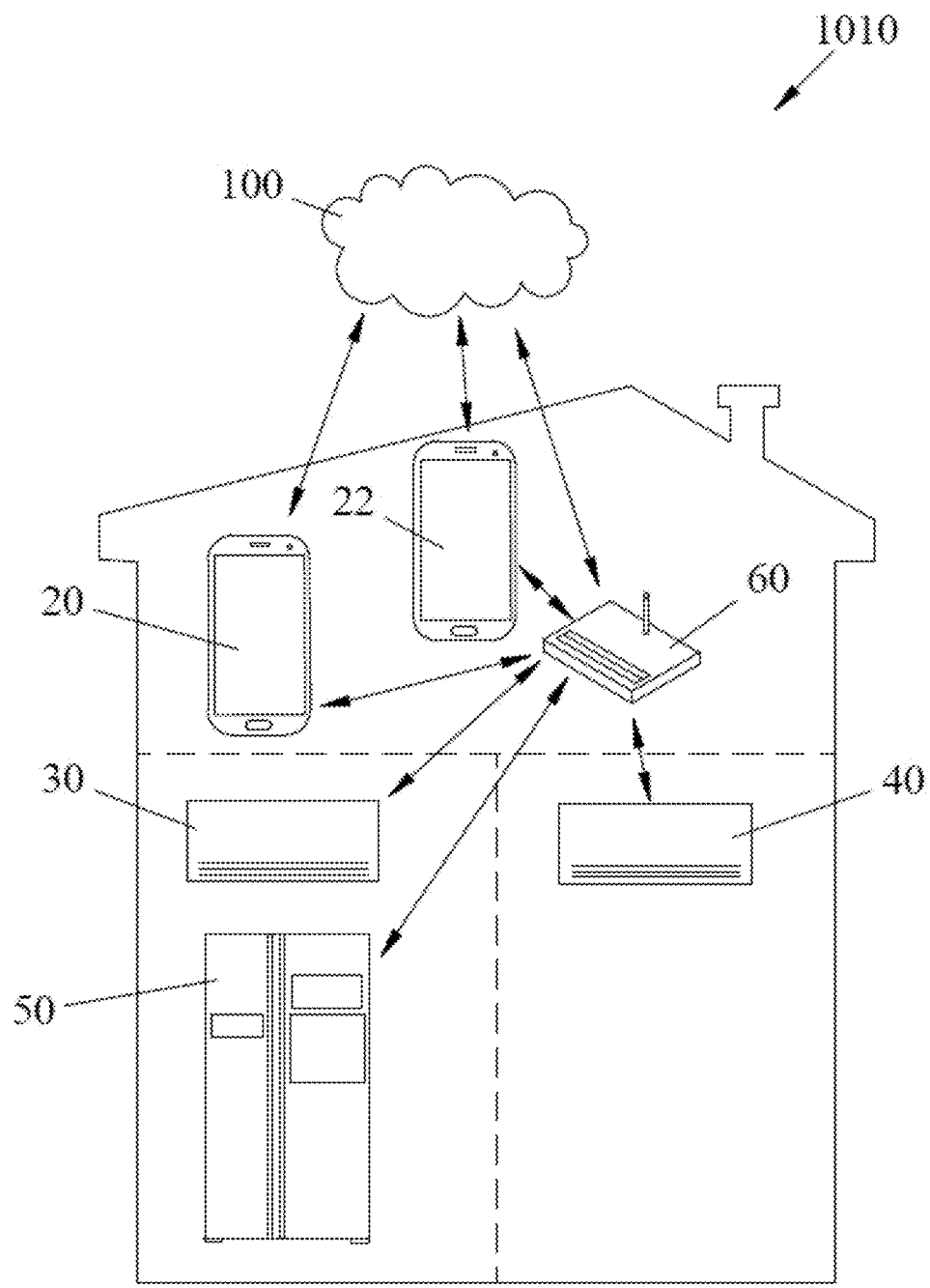
FIG. 37 is a diagram of a network system in accordance with a second embodiment of the present disclosure.

FIG. 37 shows a schematic view of a network system (1010) according to a further aspect of the present invention.

The network system (1010) differs from the network system (10) illustrated and describe with reference to FIG. 1 in that it has a second terminal device (22). The second terminal device (22) preferably has the same features of the first terminal device (20) above described and preferably comprises an electronic device capable of transmitting and receiving data through wireless communication and having an interface for the user to interact, such as a touchscreen. The second terminal device (22) preferably comprises a smart phone or a tablet equipped with a touchscreen. The second terminal device (22) preferably comprises a processor and a memory so that the terminal device (22) may store and execute programs including instructions, preferably APPs.

In the network system (1010) it is assumed that the first terminal device (20) is used by a first user and the second terminal device (22) is used by a second user.

The cloud server (100) therefore stores both first user information and second user information, further to home appliances information relating the network system (1010).

Figure 38:
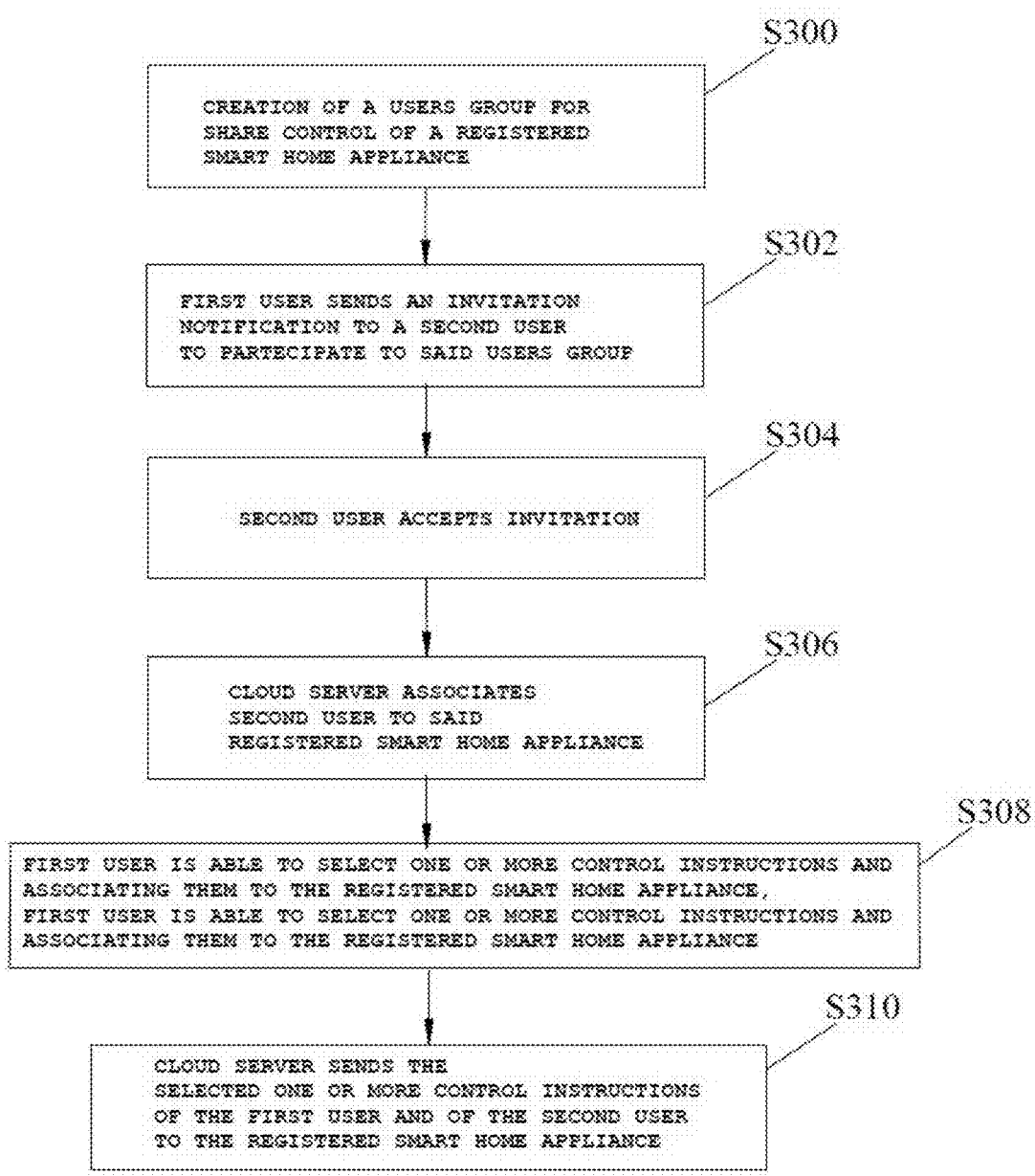
FIG. 38 is a flow chart illustrating a process for controlling the functioning of smart home appliances of a network system in accordance with a third aspect of the present disclosure.

FIG. 38 is a flow chart illustrating an exemplary process for controlling the functioning of one or more of the registered smart home appliances (30, 40, 50) through the APP on the terminal devices (20, 22) in accordance with an advantageous aspect of the present invention. FIGS. 39 to 46 are views illustrating exemplary screens displayed on the first terminal device (20) during said process of controlling the functioning of one or more of the registered smart home appliances (30, 40, 50).

As illustrated in FIG. 38, a phase of creating a user's group is implemented and may be set up by using the first terminal device (20) of the first user, preferably by acting on the touchscreen of the first terminal device (20) by the first user (step (S300))

The users group according to the present invention preferably comprises a main user, or owner, and:
one or more co-owners users; and/or
one or more normal users; and/or
one or more restricted users.

The owner is the first user that via its terminal device (20), with the APP installed therein, creates the network system (1010). Creation of the network system (1010), as explained above, first requires the registration process to register the first user account and then the registration process to register the smart home appliances (30, 40, 50) by the first registered user. The owner manages the network system (1010) and has full access to all the available functions of the APP on its terminal device (20).

For example, the owner can register a new smart home appliance, delete a registered smart home appliance, create activities or routines, add another user as described hereinafter, delete another user, etc.

The co-owner is a user that via with its terminal device participates to the network system (1010), as better described below. The co-owner, as the owner, can manage the network system (1010) and has full access to all the available functions of the APP on its first terminal device.

The normal user is a user that with its terminal device participates to the network system (1010), as better described below. The normal user can partially manage the network system (1010) and has a restricted access to the available functions of the APP on its terminal device, so that some functions of the APP are not allowed (for example a normal user cannot register a new smart home appliance or add a new user).

The restricted user is a user that with its terminal participates to the network system (1010). The restricted user can partially manage the network system (1010) and has a more restricted access to the available functions of the APP on its terminal device, so that some more functions of the APP are not allowed.

The users group can be seen as a "family" or a "home" or a "house".

Back to FIG. 38, the method comprises a step of creating a user's group (step (S300)).

Preferably, the first user, which is actually the owner, creates the users group (step (S300)).

In an embodiment, the first user via the first terminal device (20), preferably via the touchscreen of the terminal device (20), sends an invitation notification to the second terminal device (22) of the second user to participate to the users group (step (S302)).

By accepting the invitation via its terminal device (22) (step (S304)), the second user becomes a member of the users group.

Preferably, the invitation specifies if the second user is invited as a co-owner user or a normal user or a restricted user. Accordingly, the second user accepting the invitation becomes a member of the users group as a co-owner user or a normal user or restricted user.

In a preferred embodiment, the first user sends an invitation notification on the terminal device of the second user, preferably an invitation notification that appears on a dedicated screen of the APP on the terminal device of the second user.

In a further preferred embodiment, in case the APP is not installed in the terminal device of the second user, the first user sends an invitation notification on the terminal device of the second user with a link to download the APP from an application storage server.

The second user may then download the APP and accept the invitation.

The aim of creating a user's group is to define a shared control system wherein the users grouped in the users group can control the functioning of a common registered smart home appliance.

In step (S306), the cloud server (100) associates the second terminal device of the second user to a registered smart home appliance (30, 40, 50).

Step (S308) indicates that the first user is able to select on its terminal device one or more control instructions and to associate the selected one or more control instructions to the registered smart home appliance, preferably via the touchscreen of the first terminal device (20).

Analogously, the second user is able to select on its terminal device one or more control instructions and to associate the selected one or more control instructions to the registered smart home appliance, preferably via the touchscreen of the second terminal device (22).

According to an aspect of the invention, the cloud server (100) manages the functioning of the selected one or more smart home appliances according to control instructions selected by the first user and the second user (step (S310)).

In step (S310), the cloud server (100) sends the selected one or more control instructions of the first user and of the second user to the registered smart home appliance. A shared control of common registered smart home appliances for the users of the group is therefore advantageously obtained.

FIGS. 39 to 46 are views illustrating an exemplary screen displayed on the first terminal device (20) during a process of controlling home appliances (30, 40, 50) in a network system (1010) as illustrated in FIG. 37 and according to a first embodiment of the above described method shown in FIG. 38.

Figure 39:
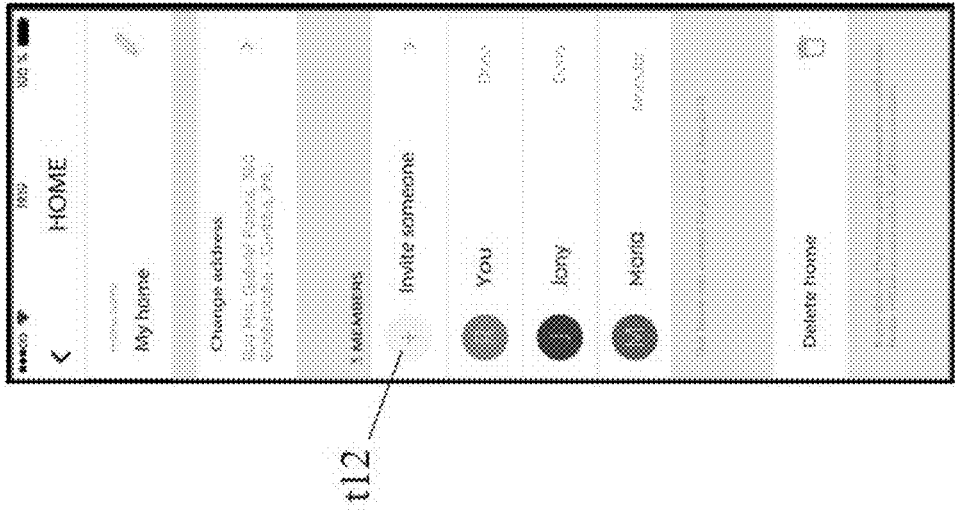

As illustrated in FIG. 39, the terminal device (20) displays a main screen HOME with information about the actual users group "My home".

It is assumed that the users group has been already created.

According to present example, the users group "My home" comprises the owner itself "You", a co-owner user "Jony" and a normal user "Maria".

Figure 40:
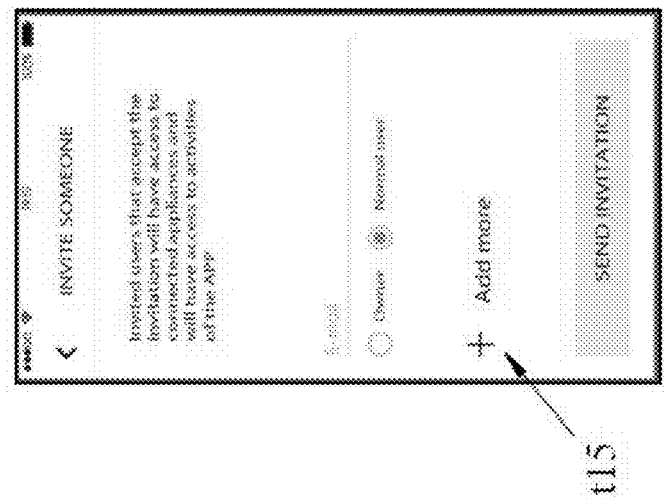

The owner may start to invite another person/user to participate to the users group by touch operating the addition tool t12. The terminal device (20) displays a new invitation screen, as illustrated in FIG. 40, in response to touch operation.

Figure 41:
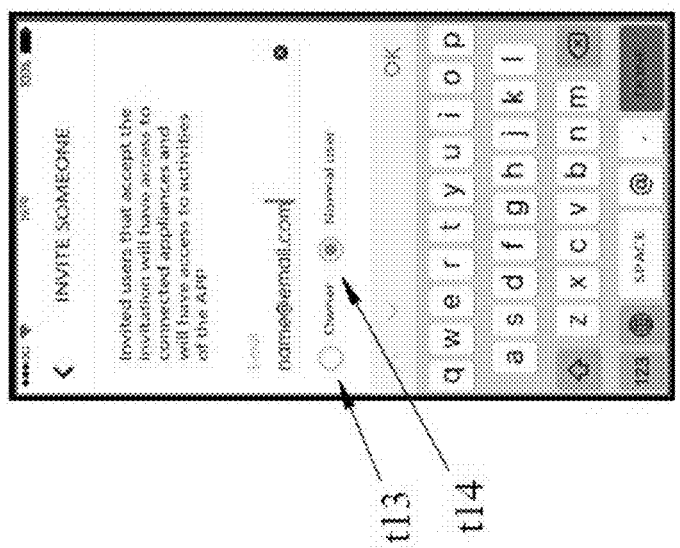
FIGS. 39 to 46 are views illustrating an exemplary screen displayed on a terminal device during a process for controlling the functioning of smart home appliances.

When the new invitation screen is displayed, the owner may type an E-mail address of the user he wishes to invite (FIG. 41).

The owner may also decide/select if the user has to be invited as a co-owner or a normal user by touch operating corresponding selection tools (toggle t13 and t14). In a further preferred embodiment, not shown, the invitation screen may comprise a further selection tool (toggle) for invitation as a restricted user.

Figure 42:
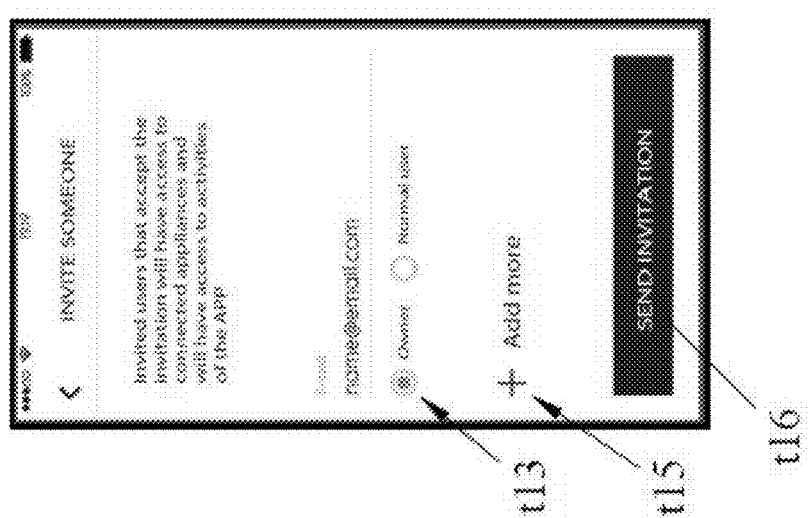
Figure 46:
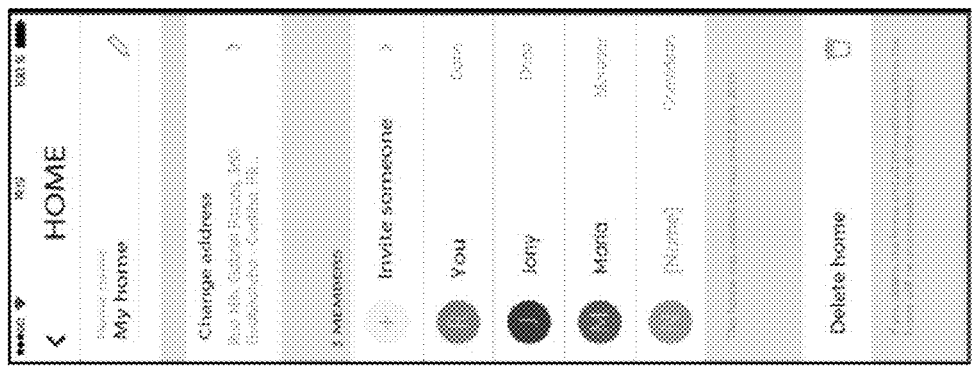

Here, the owner is inviting a first user as a co-owner (FIG. 42).

Once the E-mail address has been inserted, a request of invitation may be sent by touch operating the sending tool t16 (SEND INVITATION) (FIG. 42).

Figure 44:
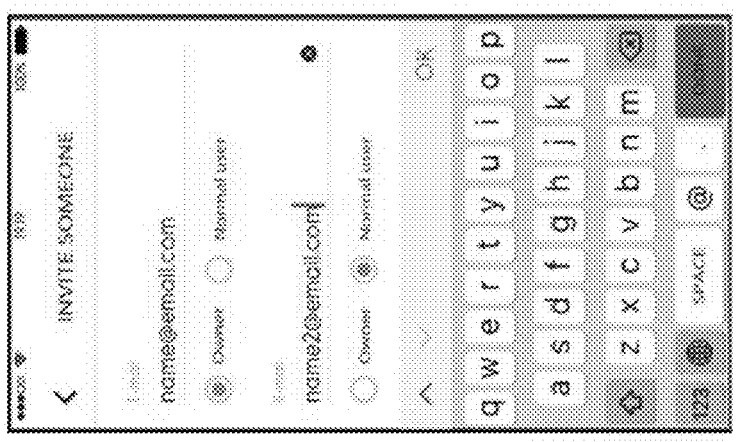

The owner may also invite another person/user by touch operating the addition tool t15 (FIG. 43) and typing a respective E-mail address (FIG. 44).

Figure 43:
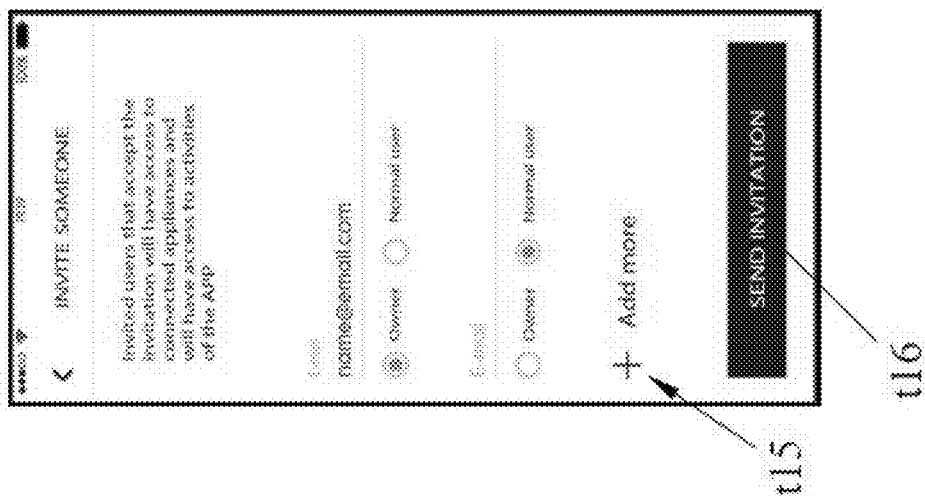
Figure 45:
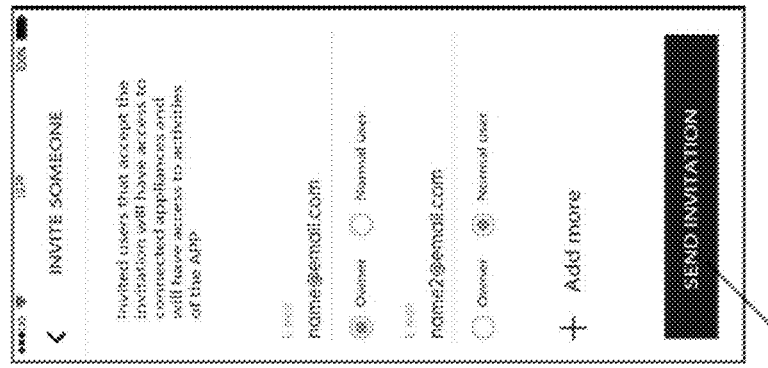

Here, the owner is inviting a second user as a normal user (FIGS. 43 to 45).

Other people/users may be further invited by touch operating the addition tool t15.

Once the E-mail address has been inserted, a request of invitation may be sent by touch operating the sending tool t16 (SEND INVITATION) (FIG. 45).

If the terminal device of the invited user has the APP installed therein, the cloud server (100) sends an invitation notification on the terminal device of the invited user, preferably on a dedicated screen of the APP.

In case the APP is not installed in the terminal device of the invited user, the cloud server (100) sends an invitation notification on the terminal device of the invited user with a link to download the APP from an application storage server.

After the invitation has been performed successfully, the terminal device (20) displays again the main screen HOME with information about the actual users group "My home" (FIG. 46) where the new invited user appears as "Invited".

When the invited user accepts the invitation on its terminal device, he finally becomes a member of the users group. Members of the users group will be updated, and the invited user will become co-owner, or normal user or restricted user, of the users group. For example, the invited user will appear as the last member together with "You", "Jony" and "Maria".

Preferably, the members of the users group are displayed through respective icons comprising identification data referred to the member.

For example, identification data may comprise a photo of the member and/or the name of the member and/or the initial of the name, as better shown in FIG. 17.

According to an aspect of the invention, each member of a user's group may select separately one or more control instructions for controlling a common registered smart home appliance and the cloud server (100) will manage said control instructions coming from each member for operating the common registered smart home appliance to which the control instructions are addressed.

For example, a first user of a user's group may send a "switch ON" signal and "SLEEP MODE" signal to the first air conditioning unit (30). The cloud server (100) will operate accordingly the first air conditioning unit (30) by sending it the "switch ON" and "SLEEP MODE" control instructions. Later, a second user of the same users group may send a "switch OFF" signal to the first air conditioning unit (30). The cloud server (100) will operate accordingly the first air conditioning unit (30) by sending it the "switch OFF" control instruction.

Furthermore, preferably, each member of a user's group may create by its own motion an activity/routine, with the processes explained above, so that each member may determine the functioning of common home appliances or, in other words, the functioning of common home appliances are shared among the members of the users group. For example, as illustrated in FIG. 17, each of the three members of the users group named "MY HOME", namely "You", "Jony" and "Maria", may create an activity/routine.

It is evident that each member of the users group acts via its own terminal device and the APP installed therein.

Furthermore, preferably, each member of a user's group may create by its own motion a "products group", with the process explained above, so that each member may determine which home appliances of the same type may be grouped in a common "products group" or, in other words, the functioning of common home appliances of the same type may grouped in a common "products group" and their control be shared among the members of the users group.

For example, as illustrated in FIG. 36, each of the three members of the users group named "MY HOME", namely "You", "Jony" and "Maria", may control the created "products group" called "All AC".

Eventually, the functioning of both the first air conditioning unit and the second air conditioning of the products group "All AC" may be control by any of the three member "You", "Jony" and "Maria" of the users group "MY HOME".

It has thus been shown that the present invention allows the set object to be achieved. In particular, it makes it possible to obtain a more user-friendly control of smart home appliances for user/s compared to known system.

While the present invention has been described with reference to the particular embodiments shown in the Figures, it should be noted that the present invention is not limited to the specific embodiments illustrated and described herein; on the contrary, further variants of the embodiments described herein fall within the scope of the present invention, which is defined in the claims.

The invention claimed is:

1. A method for controlling the functioning of two or more smart home appliances of a network system comprising a cloud server, a terminal device storing and executing at least one program including instructions and two or more smart home appliances, said two or more smart home appliances being registered in said cloud server, wherein the method comprises:
    selecting by a user on said terminal device two or more smart home appliances of a same first type among said two or more smart home appliances;
    grouping by said user on said terminal device said selected two or more smart home appliances of the same first type into a first products group;
    selecting by said user on said terminal device one or more control instructions;
    associating said selected one or more control instructions to said first products group to define one or more group control instructions; and
    sending, via said cloud server, one or more group control instructions to said first products group, so that all the first products group concurrently execute one or more identical functions according to said one or more group control instructions.

2. The method according to claim 1, wherein the same first type appliances are appliances that are configured to be controlled by means of the same control instructions and execute identical functions according to said control instructions.

3. The method according to claim 1, further comprising adding to said first products group a further smart home appliance of the same first type.

4. The method according claim 1, further comprising:
    selecting on said terminal device a further two or more smart home appliances of a same second type among said two or more smart home appliances;
    grouping on said terminal device said selected further two or more smart home appliances of the same second type into a second products group;
    selecting on said terminal device one or more control instructions;
    associating said selected one or more control instructions to said second products group to define one or more group control instructions; and
    sending, via said cloud server, one or more group control instructions to said second products group so that said second products group concurrently execute one or more identical functions according to said one or more group control instructions.

5. The method according to claim 1, further comprising a phase of creating an activity group by:
    selecting on said terminal device said first products group;
    selecting on said terminal device one or more control instructions;
    associating said selected one or more control instructions to said first products group;
    selecting on said terminal device a trigger event for each one of said selected one or more control instructions; and the method further comprises:
    activating on said terminal device said activity group; and
    sending, via said cloud server, said selected one or more control instructions to the first products group according to said trigger event.

6. The method according to claim 5, characterized by the fact that it comprises a step of identifying said activity group with an activity group name by typing a group name via said terminal device.

7. The method according to claim 1, wherein said step of selecting on said terminal device one or more control instructions comprises a step of selecting one or more control instructions among pre-set control instructions, wherein the pre-set control instructions are pre-prepared control instructions registered in said cloud server and/or in said terminal device, which may be executed by said selected one or more smart home appliances or said pre-set control instructions are pre-prepared control instructions created by a user and registered in said cloud server and/or in said terminal device which may be executed by said selected one or more smart home appliances.

8. The method according to claim 5, wherein the method further comprises sending an alert notification to said terminal device when said trigger event occurs or is about to occur or has just occurred and a step of replying through said terminal device to enable said cloud server to send said selected one or more control instructions to said selected one or more smart home appliances.

9. The method according to claim 5, wherein the method further comprises sending a reminder notification to said terminal device to remind that said trigger event occurs or is about to occur or has just occurred.

10. The method according to claim 5, wherein said step of selecting a trigger event for said control instruction comprises selecting a date and/or a time.

11. The method according to claim 5, wherein said step of selecting a trigger event for said control instruction comprises:
  selecting a date; and
  selecting a starting time and an ending time or duration for said selected control instruction.

12. The method according to claim 11, wherein said duration time is automatically set at a predetermined value once the starting time has been selected.

13. The method according to claim 5, wherein said step of selecting a trigger event for said selected control instruction comprises:
  selecting a starting time and an ending time or duration within a day for said selected control instruction; and
  activating said starting time and said ending time or duration by selecting one or more days of the week for repeating said selected control instruction at said selected one or more days of the week.

14. The method according to claim 5, wherein said trigger event is a geographical location-based event wherein said geographical location is determined by said cloud server which receives a positioning information from a GPS unit of said terminal device.

15. The method according to claim 14, wherein said geographical location-based event comprises starting or ending said selected one or more control instructions when said terminal device reaches a predetermined distance from the geographical location of said selected one or more smart home appliances while said terminal device is moving away from said selected one or more smart home appliances.

16. The method according to claim 15, wherein said geographical location-based event comprises:
  detecting via said cloud server when said terminal device reaches a predetermined distance from the geographical location of said selected one or more smart home appliances while said terminal device is moving away from said selected one or more smart home appliances;
  sending a notification to said terminal device to accept the starting or ending of said selected control instruction; and
  accepting said notification via said terminal device.

17. The method according to claim 14, wherein said geographical location-based event comprises starting or ending said selected control instruction when said terminal device reaches a predetermined distance from the geographical location of said selected one or more smart home appliances while said terminal device is moving towards said selected one or more smart home appliances.

18. The method according to claim 5, wherein said trigger event depends on the functioning mode of said selected one or more smart home appliances and/or the functioning status of said selected one or more smart home appliances and/or historical data of said selected one or more smart home appliances.

19. The method according to claim 1, wherein said network system comprises:
  a first user registered in said cloud server using said terminal device, said first user being able to select on said first terminal device one or more control instructions and to associate said selected one or more control instructions to said registered smart home appliance, said cloud server being able to send said one or more control instructions selected by said first user to said registered smart home appliance; and
the method comprises:
creating a sharing users group for sharing control of said registered smart home appliance,
wherein the first user sends an invitation notification, via said program running on said terminal device, to a second terminal device of a second user to participate to said users group, said second terminal device storing and executing a program including instructions and
wherein said second user accepts the invitation notification, via said program running on said second terminal device, and
wherein said cloud server associates said second terminal device of said second user to said registered smart home appliance, said second user being able to select on said second terminal device one or more control instructions and being able to associate said selected one or more control instructions to said registered smart home appliance, and said cloud server being able to send said one or more control instructions selected by said second user to said registered smart home appliance.

20. The method according to claim 19, wherein, after said step of creating a sharing users group, said program running on said terminal device of said first user displays said first user and said second user as members of said users group and said program running on said second terminal device displays said first user and said second user as members of said users group.

21. The method according to claim 19, wherein said program running on said terminal device of said first user further displays said registered smart home appliance associated to said members of said users group and said program running on said second terminal device further displays said registered smart home appliance associated to said members of said users group.

22. The method according to claim 20, wherein said first user is displayed through an icon comprising identification data referred to said first user and said second user is displayed by an icon comprising identification data referred to said second user.

23. The method according to claim 22, wherein said identification data comprises photo and/or name of the user and/or the initial of the name.

24. The method according to claim 1, wherein the same first type comprises air conditioning units.

25. The method according to claim 4, wherein the same second type comprises air conditioning units.

26. The method according to claim 1, the method further comprising:
  presenting, via a display of said terminal device, a list of smart home appliances;
  receiving a first user selection on said terminal device, said first user selection comprising said selected two or more smart home appliances of the same first type from said list of smart home appliances; and
  receiving a second user selection on said terminal device of said one or more control instructions.

* * * * *